(12) United States Patent
Nagahara et al.

(10) Patent No.: US 8,265,449 B2
(45) Date of Patent: Sep. 11, 2012

(54) INFORMATION DELIVERY APPARATUS, STREAM RECORDING APPARATUS, RECORDING SYSTEM, STREAM REPRODUCING APPARATUS, AND RECORD REPRODUCING SYSTEM

(75) Inventors: Kosaku Nagahara, Osaka (JP); Tomoki Mizobuchi, Kyoto (JP); Osamu Goto, Osaka (JP); Takuya Nomura, Osaka (JP)

(73) Assignee: Panasonic Corporation, Osaka (JP)

( * ) Notice: Subject to any disclaimer, the term of this patent is extended or adjusted under 35 U.S.C. 154(b) by 1266 days.

(21) Appl. No.: 11/964,230

(22) Filed: Dec. 26, 2007

(65) Prior Publication Data
US 2008/0152016 A1   Jun. 26, 2008

(30) Foreign Application Priority Data
Dec. 26, 2006 (JP) .................. 2006-350259

(51) Int. Cl.
H04N 5/935 (2006.01)
H04N 5/931 (2006.01)
H04N 5/932 (2006.01)
H04N 5/77 (2006.01)
H04N 7/14 (2006.01)
H04H 5/38 (2006.01)
H04N 7/00 (2006.01)

(52) U.S. Cl. ........ 386/224; 386/212; 386/213; 386/223; 386/210; 386/226; 348/14.01; 348/14.02; 348/14.11; 348/21; 348/22; 348/24

(58) Field of Classification Search .................. 386/210, 386/212, 213, 223, 224, 226; 348/14.01, 348/14.02, 14.11, 21, 22, 24
See application file for complete search history.

(56) References Cited

U.S. PATENT DOCUMENTS

| | | | | |
|---|---|---|---|---|
| 5,267,039 A * | 11/1993 | Elberbaum | ................... | 348/476 |
| 6,249,324 B1 * | 6/2001 | Sato et al. | ...................... | 348/705 |
| 6,956,477 B2 * | 10/2005 | Chun | .......................... | 340/541 |
| 7,146,052 B2 * | 12/2006 | Sugimura et al. | ............. | 382/232 |
| 7,171,106 B2 * | 1/2007 | Elberbaum | ................... | 386/202 |
| 8,027,115 B2 * | 9/2011 | Fujita et al. | ...................... | 360/55 |
| 2002/0003573 A1 * | 1/2002 | Yamaguchi et al. | .......... | 348/218 |
| 2002/0004840 A1 | 1/2002 | Harumoto et al. | | |
| 2004/0247282 A1 * | 12/2004 | Nishi et al. | ....................... | 386/46 |
| 2006/0070106 A1 | 3/2006 | Kitazato | | |
| 2006/0152786 A1 | 7/2006 | Takakuwa et al. | | |

FOREIGN PATENT DOCUMENTS

| | | |
|---|---|---|
| JP | 11-103444 | 4/1999 |
| JP | 11-112567 | 4/1999 |
| JP | 2000-244914 | 9/2000 |
| JP | 2001-008205 | 1/2001 |
| JP | 2001-128165 | 5/2001 |
| JP | 2003-284009 | 10/2003 |
| JP | 2005-167668 | 6/2005 |
| JP | 2006-157492 | 6/2006 |
| JP | 2006-229767 | 8/2006 |

* cited by examiner

*Primary Examiner* — Daquan Zhao
(74) *Attorney, Agent, or Firm* — McDermott Will & Emery LLP

(57) ABSTRACT

An information delivery apparatus includes an encoder for encoding and packetizing digital data of an image or an audio, a frame assembly identification packet insertion unit for inserting a frame assembly identification packet including time information in the data packetized by the encoder on a frame assembly basis, and a transmission side communication module for outputting to a network the stream data having the frame assembly identification packet inserted therein by the frame assembly identification insertion unit.

9 Claims, 20 Drawing Sheets

FIG. 2

| Camera identifier | Packet ID | | |
|---|---|---|---|
| Camera 110 | Camera identification | Image | Audio |
| | No.001 | No.002 | No.003 |
| Camera 120 | Camera identification | Image | Audio |
| | No.004 | No.005 | No.006 |
| Not assigned | Camera identification | Image | Audio |
| | No.007 | No.008 | No.009 |
| ⋮ | | | |

| Camera identifier | Packet ID |
|---|---|
| Camera 110 | No.001 |
| Camera 120 | No.002 |
| Not assigned | No.003 |
| ⋮ | |

FIG. 7

| Camera identifier | Frame assembly ID | Time | Address |
|---|---|---|---|
| Camera 110 | #101001 | 10:48:50.50 | B8xxxxxx |
| | #101002 | 10:48:51.00 | B8xxxyyy |
| | ⋮ | ⋮ | ⋮ |
| Camera 120 | #106001 | 10:48:50.50 | B8yyyyyy |
| | #106002 | 10:48:51.00 | B8yyyxxx |
| | ⋮ | ⋮ | ⋮ |
| ⋮ | | | |

FIG. 8

| PG | Time |
|---|---|
| Camera 110 | 10:48:50.50-11:00:00 |
| | 11:00:01-11:10:50.50 |
| | ⋮ |
| Camera 120 | — |
| | 11:00:01-11:10:50.50 |
| | ⋮ |
| | ⋮ |

FIG. 9

| #106001 | #101001 | #101002 | #101003 | #106002 | #101004 | #106003 | #106004 |

FIG. 10

| #106001 | #101001 | #106002 | #101002 | #106003 | #101003 | #106004 | #101004 |

FIG. 11

| PG | Time | Buffer position information |
|---|---|---|
| Camera 110 | 11:00:01-11:10:50.50 | 0xb2000000 |
| | — | |
| | . . . | |
| Camera 120 | 11:00:01-11:10:50.50 | 0xb2500000 |
| | 11:10:51-11:12:00.00 | 0xb2a00000 |
| | . . . | |
| . . . | . . . | |

FIG. 14

| Time | Camera identifier | Frame assembly ID | Address | Composite information | |
|---|---|---|---|---|---|
| 10:48:50.50 | Camera 110 (Packet ID=No.001) | #101001 | ******** | ******** | |
| | | | | ******** | |
| | | | | ******** | |
| ****** | ... | ... | ... | | |
| | ... | ... | ... | | |

FIG. 15

| Time | Camera identifier | Frame assembly ID | Address | Composite information | Results of composite information preparation |
|---|---|---|---|---|---|
| 10:48:50.50 | Camera 110 (Packet ID=No.001) | #101001 | ... | Program#001 | Image=No.002 |
| | | | | | Audio=No.003 |
| ***** | ... | ... | ... | | |
| | ... | ... | ... | | |
| | | | | ... | |

FIG. 16

| Time | Camera identifier | Frame assembly ID | Address | Composite information | | |
|---|---|---|---|---|---|---|
| | | | (Addition of writing position information →) | Program#001 | Image=No.002 | |
| | | | | | Audio=No.003 | |
| 10:48:50.50 | Camera 110 (Packet ID=No.001) | #101001 | B8xxxxxx | | | |
| ****** | ... | ... | ... | ... | | |

FIG. 20

| AV decoder | Stream |
|---|---|
| #1 | Camera 110 |
| #2 | Camera 120 |

INFORMATION DELIVERY APPARATUS, STREAM RECORDING APPARATUS, RECORDING SYSTEM, STREAM REPRODUCING APPARATUS, AND RECORD REPRODUCING SYSTEM

CROSS REFERENCE TO RELATED APPLICATION

This non-provisional application claims priority under 35 U.S.C §119 based on Patent Application No. 2006-350259 filed in Japan on Dec. 26, 2006, the entire contents of which are hereby incorporated by reference.

BACKGROUND OF THE INVENTION

1. Field of the Invention

The present invention relates to an information delivery apparatus of image streams or audio streams, a stream recording apparatus, a recording system, a stream reproducing apparatus, and a record reproducing system, and in particular, relates to such one used for recording streams from a plurality of information delivery apparatuses in the form of one stream in a real time manner by a recording server.

2. Description of the Prior Art

In recent years, owing to progress in broadcasting technology, a plurality of image contents are transmitted in the form of one stream data, and users are able to view image contents selectively on receiving appliances. For example, an image recording server or the like at a broadcasting station or the like collects a plurality of AV streams obtained by shooting by a plurality of cameras and stores them temporarily. The plurality of stored AV streams are then converted to one stream by editing by a user using an authoring tool, and are delivered as one media content.

In collecting and delivering record contents via a network, a plurality of AV streams of the same instant arrive at the receiving-side user terminal at different timings due to transmission delay or the like, and therefore, it is necessary to provide many buffers at the user terminal in order to maintain synchronization of the AV streams. Japanese Laid-Open Patent Publication No. 2005-167668 discloses such a technology that, in order to reduce the number of buffers, an image delivery apparatus predicts transmission delay in advance, and data is transmitted at a timing corresponding to the predicted transmission delay.

SUMMARY OF THE INVENTION

However, with editing by the user, there arises such a problem that the editing job takes much time.

In light of the aforementioned problem, an object of the present invention is to record image or audio data transmitted from a plurality of information delivery apparatuses in the form of one stream in a real time manner.

In order to accomplish the object, a recording system of a first embodiment of the present invention is a recording system having a plurality of information delivery apparatuses and a stream recording apparatus. Each of the plurality of information delivery apparatuses includes: an encoder for encoding and packetizing digital data of an image or an audio; a frame assembly identification packet insertion unit for inserting a frame assembly identification packet including time information in the data packetized by the encoder on a frame assembly basis; and a transmission side communication module for outputting to a network the stream data having the frame assembly identification packet inserted therein by the frame assembly identification insertion unit. The stream recording apparatus includes: a receiver side communication module for receiving from a network stream data and for outputting the stream data; a plurality of buffers for storing temporarily the stream data output by the receiver side communication module; a buffer assignment unit for storing assignment information indicating a corresponding relationship between a plurality of information delivery apparatuses and the plurality of buffers; a stream sorting unit for determining, based on the assignment information stored in the buffer assignment unit, which of the buffers is to hold the stream data output by the receiver side communication module; a stream selector for causing, according to the determination by the stream sorting unit, the determined buffer to hold the stream data output by the receiver side communication module; a frame assembly extraction unit for reading the stream data from the determined buffer on a frame assembly basis; a frame assembly synchronizing unit for, based on the time information included in the frame assembly identification packet inserted to the stream data, maintaining synchronization between frame assemblies in the stream data read by the frame assembly extraction unit, and for outputting synchronization information for associating frame assemblies of the same time with each other; a composite information preparation unit for preparing composite information indicating a data composition of the stream data, based on information corresponding to which of the information delivery apparatuses has output each of the frame assemblies read by the frame assembly extraction unit, and based on the synchronization information output by the frame assembly synchronizing unit, for multiplexing the composite information and the stream data, and for outputting the multiplexed stream data so that frame assemblies of the same time from the plurality of information delivery apparatuses become continuous; and a writing unit for recording the stream data read by the frame assembly extraction unit in a recording medium.

With these features, image data or audio data transmitted from a plurality of information delivery apparatuses are output by the composite information preparation unit as single stream data in which frame assemblies of the same time are continuous, and recorded as single stream data by the writing unit.

A record reproducing system according to a second embodiment of the present invention is a record reproducing system having a plurality of information delivery apparatuses, a stream recording apparatus, and a stream reproducing apparatus. Each of the plurality of information delivery apparatuses includes: an encoder for encoding and packetizing digital data of an image or an audio; a frame assembly identification packet insertion unit for inserting a frame assembly identification packet including time information in the data packetized by the encoder on a frame assembly basis; and a transmission side communication module for outputting to a network the stream data having the frame assembly identification packet inserted therein by the frame assembly identification insertion unit. The stream recording apparatus includes: a receiver side communication module for receiving from a network stream data and for outputting the stream data; a plurality of buffers for storing temporarily the stream data output by the receiver side communication module; a buffer assignment unit for storing assignment information indicating a corresponding relationship between a plurality of information delivery apparatuses and the plurality of buffers; a stream sorting unit for determining, based on the assignment information stored in the buffer assignment unit, which of the buffers is to hold the stream data output by the receiver side communication module; a stream selector for causing, according to the determination by the stream sorting unit, the determined buffer to hold the stream data output by the receiver side communication module; a frame assembly extraction unit for reading the stream data from the determined buffer on a frame assembly basis; a frame assembly synchronizing unit for, based on the time information included in the frame assembly identification packet inserted to the stream data, maintaining synchronization between frame assemblies in the stream data read by the frame assembly extraction unit, and for outputting synchronization information for associating frame assemblies of the same time with each other; a writing unit for recording the stream data read by the frame assembly extraction unit in a recording medium; and a management information update unit for preparing management information that associates information indicating which of information delivery apparatuses has output each of frame assemblies, time information of each of the frame assemblies, and recording position information indicating a recording position in the recording medium of each of the frame assemblies. The stream reproducing apparatus includes: a switching control unit for outputting selection information indicating which stream data is selected by a viewer; a buffer; a reading control unit for preparing information indicating a list of currently reproducible data based on the management information recorded in the recording medium, and for reading from the recording medium to the buffer a plurality of frame assemblies of the same time alternately, based on the selection information output by the switching control unit; a reproduced data transfer unit for reading from the buffer the stream data indicated by the selection information; an AV decoder for decoding the stream data read by the reproduced data transfer unit; and an AV output for displaying an image on a monitor based on the data decoded by the AV decoder.

With these features, the management information that associates information indicating which of information delivery apparatuses has output each of frame assemblies, time information of each of the frame assemblies, and recording position information indicating a recording position in the recording medium of each of the frame assemblies is recorded in the recording medium. The reading control unit is able to prepare information indicating a list of stream data which are currently reproducible based on this management information.

A record reproducing system according to a third embodiment of the present invention is a recording system having a plurality of information delivery apparatuses and a stream recording system. Each of the plurality of information delivery apparatuses includes: an encoder for encoding and packetizing digital data of an image or an audio; and a transmission side communication module for outputting to a network the data packetized by the encoder. The stream recording apparatus includes: a receiver side communication module for receiving the packetized data from a network and outputting the packetized data; a frame assembly identification packet generation unit for extracting a frame assembly by analyzing packets of the packetized data, and for inserting a frame assembly identification packet including time information in the packetized data on a frame assembly basis; a plurality of buffers for temporarily storing the stream data having the frame assembly identification packet inserted therein by the frame assembly identification packet generation unit; a buffer assignment unit for storing assignment information indicating a corresponding relationship between a plurality of information delivery apparatuses and the plurality of buffers; a stream sorting unit for determining, based on the assignment information stored in the buffer assignment unit, which of the buffers is to hold the stream data having the frame assembly identification packet inserted therein by the frame assembly identification packet generation unit; a stream selector for causing the determined buffer to hold the stream data having the frame assembly identification packet inserted therein by the frame assembly identification packet generation unit, according to a determination by the stream sorting unit; a frame assembly extraction unit for reading the stream data from the buffer on a frame assembly basis; a frame assembly synchronizing unit for maintaining synchronization between frame assemblies in the stream data read by the frame assembly extraction unit based on time information included in the frame assembly identification packet inserted in the stream data, and for outputting synchronization information for associating frame assemblies of the same time; a composite information preparation unit for preparing composite information indicating a data composition of the stream data, based on information corresponding to which of the information delivery apparatuses has output each of the frame assemblies read by the frame assembly extraction unit, and based on the synchronization information output by the frame assembly synchronizing unit, for multiplexing the composite information and the stream data, and for outputting the multiplexed stream data so that frame assemblies of the same time from the plurality of information delivery apparatuses become continuous; and a writing unit for recording the stream data output by the composite information preparation unit in a recording medium in the order of output.

With these features, a frame assembly identification packet is inserted in the packetized data by the frame assembly identification packet generation unit of the stream recording apparatus. Accordingly, the frame assembly identification packet is inserted in the data in the information delivery apparatus, and load against the network are reduced compared with the case where data including the frame assembly identification packet is output to the network.

BRIEF DESCRIPTION OF THE DRAWINGS

FIG. 2 is a drawing for explanation of a packet ID assignment management table according to Embodiment 1.

FIG. 4 is a drawing for explanation of composition of a recorded data recorded in a recording medium 143 according to Embodiment 1.

FIG. 6 is a drawing for explanation of a packet ID assignment management table according to Embodiment 2.

FIG. 7 is a drawing for explanation of a management information table according to Embodiment 2.

FIG. 8 is a drawing for explanation of a list of reproducible stream data which is shown on a monitor 260 according to Embodiment 2.

FIG. 9 is a drawing for explanation of data composition of stream data in a stream region 245 of a recording medium 244 according to Embodiment 2.

FIG. 10 is a drawing for explanation of data composition of stream data in a buffer 251 according to Embodiment 2.

FIG. 11 is a drawing for explanation of a list of reproducible stream data according to Embodiment 2.

FIG. 14 is a drawing for explanation of data managed by a frame identification information holding unit 431 according to Embodiment 4.

FIG. 15 is a drawing for explanation of data managed by the frame identification information holding unit 431 according to Embodiment 4.

FIG. 16 is a drawing for explanation of data managed by the frame identification information holding unit 431 according to Embodiment 4.

FIG. 20 is a drawing for explanation of an example of an AV decoder management table according to Embodiment 7.

DESCRIPTION OF THE PREFERRED EMBODIMENT

Referring now to drawings, embodiments of the present invention will be explained hereafter. In each of the embodiments, the same symbol will be used for components having identical functions with those in other embodiments and explanation thereof will be omitted.

Embodiment 1

Figure 1:
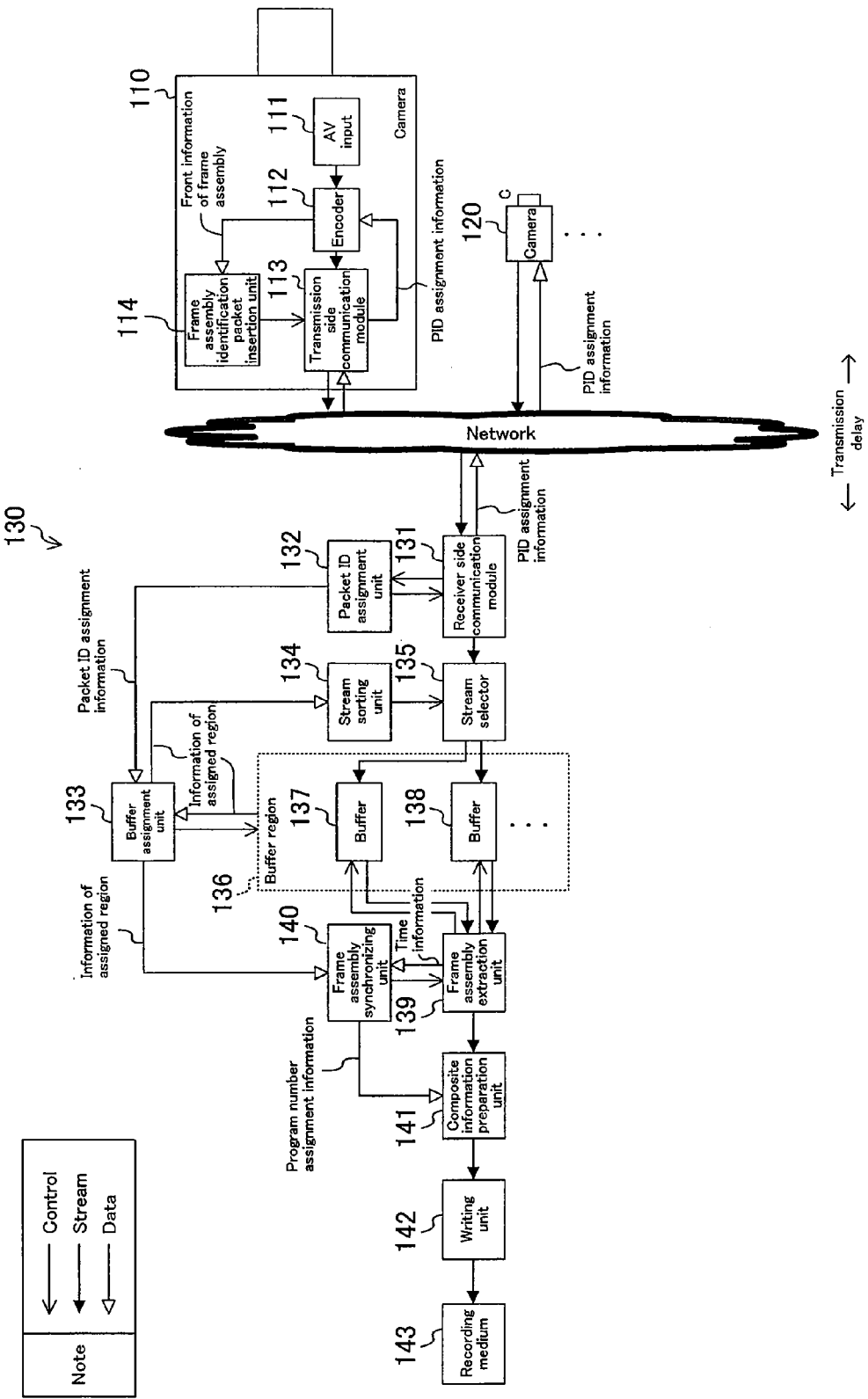
FIG. 1 is a block diagram showing composition of a recording system according to Embodiment 1.

A recording system according to Embodiment 1 of the present invention includes, as shown in FIG. 1, a plurality of cameras 110, 120, . . . and a recording server 130. The cameras 110, 120, . . . are connected to the recording server 130 via a network.

Each of the cameras 110, 120, . . . (imaging apparatus) has a function to take in analogue audio data as well as analogue image data, convert the taken-in analogue data to digital data, encode the digital data, and transmit it to the recording server 130. Specifically, each of the cameras includes an AV input 111, an encoder 112, a transmission side communication module 113, and a frame assembly identification packet insertion unit 114.

The recording server 130 (stream recording apparatus) includes a receiver side communication module 131, a packet ID assignment unit 132 (identifier assignment unit), a buffer assignment unit 133, a stream sorting unit 134, a stream selector 135, a buffer region 136, a frame assembly extraction unit 139, a frame assembly synchronizing unit 140, a composite information preparation unit 141, a writing unit 142, and a recording medium 143. The buffer region 136 is provided with buffers 137, 138, . . . .

First, operation of each unit when the cameras 110, 120, . . . are connected to the recording server 130 via the network will be explained.

When connected to the network, the transmission side communication module 113 provided inside of each of cameras 110, 120, . . . transmits unique information for discriminating the camera from other cameras, i.e., information for identifying each camera, to the recording server 130. This unique information is, for example, MAC address (media access control address) possessed by the transmission side communication module 113. However, it is not limited thereto.

The receiver side communication module 131 receives the information for identifying each camera transmitted from each of the cameras 110, 120, . . . .

The packet ID assignment unit 132 detects that the information for identifying each camera is received by the receiver side communication module 131 and assigns a unique packet ID for the camera which has transmitted the information. The packet ID assignment unit 132 then controls the receiver side communication module 131 so that the receiver side communication module 131 transmits the assigned packet ID to the corresponding camera. That is, packet ID assignment unit 132 causes the receiver side communication module 131 to transmit the assigned packet ID to the corresponding camera. Further, the assigned packet ID is notified to the buffer assignment unit 133. The packet ID assignment unit 132 holds a packet ID assignment management table for managing the packet ID assigned to each camera. FIG. 2 is a drawing for explanation of the packet ID assignment management table. FIG. 2 shows that No. 001, No. 002, No. 003 packet IDs are assigned to the camera 110, and No. 004, No. 005, No. 006 packet IDs are assigned to the camera 120. When the packet ID is assigned to each camera, the packet ID assignment unit 132 refers to a table as shown in FIG. 2, stores (registers), as a camera identifier of a yet-unassigned camera, information for identifying the camera transmitted from the camera, and acquires a packet ID corresponding to the camera identifier.

The buffer assignment unit 133 determines which buffer (buffer region) is to hold stream data containing each assigned packet ID. The buffer assignment unit 133 stores the assigned packet ID (information for identifying the information delivery apparatus) and information for identifying buffer in association with each other. That is, the information stored in the buffer assignment unit 133 indicates a correspondence relationship between the plurality of cameras 110, 120, . . . and the buffer for holding stream data sent from each camera (assigned information). In this example, suppose such a determination is made that stream data including packet ID assigned to the camera 110 is held by the buffer 137 and stream data including packet ID assigned to the camera 120 is held by the buffer 138. The receiver side communication module 131 transmits the packet ID assigned by the packet ID assignment unit 132 to a corresponding camera. Upon receiving the packet ID transmitted by the receiver side communication module 131, the transmission side communication module 113 of the camera 110 causes the encoder 112 to store the packet ID.

The encoder 112 receives packet IDs capable of being assigned to data from the transmission side communication module 113 and stores them. The encoder 112 then assigns the packet IDs to audio data and image data. For example, when packet IDs are assigned from the recording server 130 as shown in FIG. 2, the camera 110 receives packet IDs of No. 001, No. 002, No. 003 as those capable of being assigned to data. The encoder 112 then assigns, for example, No. 001 to camera identification data, No. 002 to image data, and No. 003 to audio data. Similarly, the camera 120 assigns No. 004 to camera identification data, No. 005 to image data, and No. 006 to audio data.

Subsequently, operation of each unit from the time when the camera 110 starts take-in (recording) of analog image data and analog audio data until data based on these data are recorded in the recording medium 143 will be explained.

The camera 110 takes in analog image data by converting an image to an electrical signal. Further, the camera 110 is provided with a microphone for taking-in analog audio data by converting an acoustic wave to an electrical signal.

The AV input 111 converts analog image data and analog audio data or the like to digital image data and digital audio data or the like and outputs them.

Upon receiving the digital image data and digital audio data or the like output by the AV input 111, the encoder 112 outputs information indicating receipt of a front of the frame assembly to the frame assembly identification packet insertion unit 114. Subsequently, the encoder 112 starts encoding of the digital image data and digital audio data or the like. Following this, upon completion of encoding of one frame assembly, the encoder 112 again outputs information indicating that a front of the frame assembly is received to the frame assembly identification packet insertion unit 114.

As used herein, the frame assembly refers to a package of several sheets of frames. For example, the frame assembly is GOP (Group Of Picture) specified in the MPEG standard. However, the frame assembly is not limited to GOP.

The encoder 112 encodes digital image data, digital audio data or the like and further packetizes them. The encoder 112 then outputs the packetized data as stream data. When the camera 110 is connected to the recording server 130 via the network, at packetizing, packet IDs assigned to the camera 110 are given to each packet.

Figure 3:
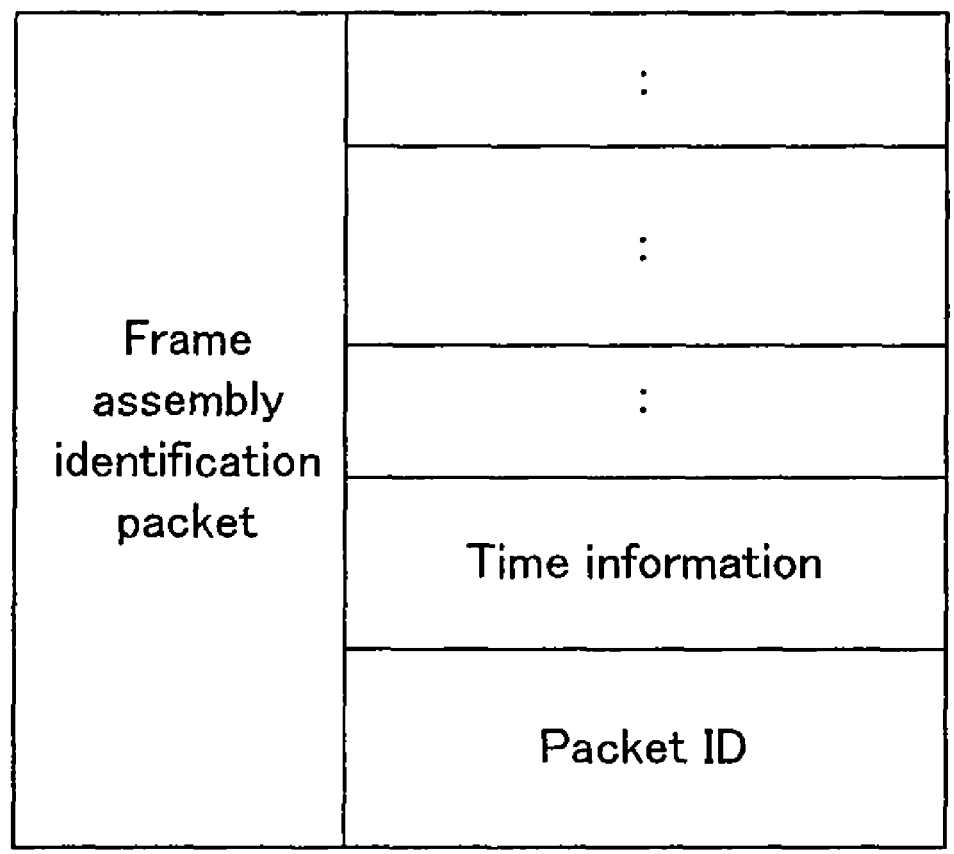
FIG. 3 is a drawing for explanation of data composition of the frame assembly identification packet according to Embodiment 1.

The frame assembly identification packet insertion unit 114, whenever information indicating receipt of a front of frame assembly output by the encoder 112 is received, inserts a frame assembly identification packet as shown in FIG. 3 in a front of frame assembly. That is, the frame assembly identification packet insertion unit 114 inserts a frame assembly identification packet for every front of frame assembly.

The transmission side communication module 113 outputs to the network stream data in which the frame assembly identification packet is inserted by the frame assembly identification packet insertion unit 114.

Here, the frame assembly identification packet shown in FIG. 3 includes two or more than two data, one of data being an packet ID and the other being time information. The packet ID is, as mentioned previously, assigned to an individual connected camera. By referring to the packet ID, it is possible to identify which of the cameras has transmitted a stream. That is, a packet ID is an identifier unique to each camera for identifying each camera. Further, by referring to time information, it is possible at the recording server side to record stream data of each camera with stream data of a camera different from that camera, and record such stream data in association with each other. The packet ID contained in the frame assembly identification packet of the stream data from each camera corresponds to the aforementioned assignment by the encoder 112.

Further, the receiver side communication module 131 receives from the network stream data transmitted from the camera 110 and outputs the stream data.

The stream sorting unit 134 monitors stream data flowing in the stream selector 135, and upon detection of a packet for unit identification, analyzes the packet and locates the packet ID. Further, the stream sorting unit 134, based on the packet ID stored in the buffer assignment unit 133 in association with buffer identifying information (assignment information), determines (controls) which of the buffer 137, 138, . . . is to hold the stream output by the receiver side communication module 131, depending on the packet ID included in the frame assembly identification packet of the stream.

The stream selector 135 performs sorting of the stream data output by the receiver side communication module 131 according to the determination (control) by the stream sorting unit 134. In this example, since data from the camera 110 is received, the stream data is held in the buffer 137.

The buffer 137 holds (temporary stores) stream data transmitted from the camera 110 (stream data output by the receiver side communication module 131).

The frame assembly extraction unit 139 monitors status of each buffer 137, 138, . . . . The frame assembly extraction unit 139 reads one buffer from the frame assembly identification packet to the end of the frame assembly and delivers time information included in the frame assembly identification packet to the frame assembly synchronizing unit 140. Further, upon detection of the next frame assembly identification packet, the frame assembly extraction unit 139 starts reading from a buffer assigned to a different camera. Since this explanation deals with stream data of the camera 110 only, reading of stream data from the buffer 138 is not carried out particularly. The frame assembly extraction unit 139 delivers (outputs) to the composite information preparation unit 141 the read stream data including the frame assembly identification packet.

The composite information preparation unit 141 prepares composite information indicating composition of the stream data, based on the stream data input from the frame assembly extraction unit 139, and multiplexes the composite information and the stream data. The composite information is, in light of, for example, the MPEG2-TS standard, equivalent to PAT (Program Association Table) or PMT (Program Map Table). To additionally explain in light of the MPEG2-TS standard, the composite information preparation unit 141 first prepares PMT, assigns the same packet as camera 110 to this PMT, and allocates a program number thereto. As elements of PMT, image data No. 002 of the camera 110 and audio data No. 003 of the camera 110 are described. Following this, PAT is prepared. Next, packet ID of No. 001 is assigned, and packet ID of No. 001 of PMT of the camera 110 is described to the element thereof. Following this, the composite information preparation unit 141 delivers to the writing unit 142 stream data containing the composite information.

The writing unit 142 records (writes) the stream data containing the composite information to the recording medium 143.

Next, operation of each unit from the time when the camera 120 in addition to the camera 110 starts take-in (recording) of analog image data and analog audio data until the stream data sent from the camera 110 and the camera 120 are recorded in the recording medium 143 will be explained.

Operation of each unit from the time when the camera 120 starts take-in (recording) of analog image data and analog audio data until stream data is transmitted to the recording server 130 and reaches the stream selector 135 is identical with the above-mentioned case where only the camera 110 takes in the data.

The stream data input to the stream selector 135 is controlled by the stream sorting unit 134 so that stream data of the camera 110 is sorted to the buffer 137 and stream data of the camera 120 is sorted to the buffer 138.

The stream sorting unit 134, based on the assigned packet ID stored in the buffer assignment unit 133 in association with the information for identifying buffer, executes control of causing the stream selector 135 to sort the stream data from each of cameras 110, 120, . . . to corresponding buffers.

Although the frame assembly extraction unit 139 performs similar operation to the one mentioned above, operation after the stream data of the buffer 137 is read is different. After reading the stream data of the buffer 137, the frame assembly extraction unit 139 reads the frame assembly identification packet of the buffer 138, and delivers (outputs) time information written in the packet to the frame assembly synchronizing unit 140.

The frame assembly synchronizing unit 140 is designed to maintain synchronization between frame assemblies from a plurality of buffers 137, 138, . . . . For example, a case where only two buffers 137, 138 are provided will be explained. In this case, the frame assembly synchronizing unit 140 compares time information of the frame assembly read previously from the buffer 137 by the frame assembly extraction unit 139 with time information of the frame assembly read currently from the buffer 138, and maintains synchronization between the plurality of frame assemblies. Further, the frame assembly synchronizing unit 140 outputs synchronization information indicating results of comparison. When, as a result of the comparison, the time of the frame assembly read previously from the buffer 137 is advanced, the frame assembly synchronizing unit 140 causes the frame assembly extraction unit 139 to output only the frame assembly read previously from the buffer 137 to the composite information preparation unit 141, and delivers to the composite information preparation unit 141 program number assignment information which prepares composite information for that frame assembly only. Then, the frame assembly synchronizing unit 140 holds the frame assembly read from the buffer 138. Next, when the time of the frame assembly read currently from the buffer 138 is advanced, the frame assembly synchronizing unit 140 causes the frame assembly extraction unit 139 to output only the frame assembly read previously from the buffer 137 to the composite information preparation unit 141 and delivers to the composite information preparation unit 141 program number assignment information which prepares composite information by that frame assembly only. Then, the frame assembly synchronizing unit 140 nullifies the frame assembly read from the buffer 138. When the time of the frame assembly read previously from the buffer 137 and the time of the frame assembly read currently from the buffer 138 are identical, the frame assembly synchronizing unit 140 causes the frame assembly extraction unit 139 to output both frame assemblies to the composite information preparation unit 141 and delivers to the composite information preparation unit 141 program assignment information of each frame assembly read from each buffer. The program number assignment information is information corresponding to information indicating which of the buffers has output the frame assembly, i.e., information corresponding to which of the cameras has transmitted the frame assembly.

When three or more than three buffers are secured, the frame assembly synchronizing unit 140 performs similar processing to the case of two buffers.

For example, in the case where a third buffer is provided in addition to the buffers 137, 138, when reading from the third buffer after reading from the buffer 138, the frame assembly synchronizing unit 140 compares time information of the frame assembly read previously from the buffer 137 with time information read from the third buffer. Further, the frame assembly synchronizing unit 140 outputs synchronization information indicating results of the comparison.

When, as a result of the comparison, time information of the frame assembly read from the third buffer and time information of the frame assembly read from the buffer 137 are identical, frame assemblies read previously from the third buffer, the buffer 137, and the buffer 138 are output by the frame assembly extraction unit 139 to the composite information preparation unit 141, and program number assignment information for preparing composite information by the frame assemblies only is output to the composite information preparation unit 141 by the frame assembly synchronizing unit 140.

In the meantime, as a result of the comparison, when time information of frame assembly read from the buffer 137 is ahead of the time information of the frame assembly read from the third buffer, frame assemblies read previously from the buffer 137 and the buffer 138 are output by the frame assembly extraction unit 139 to the composite information preparation unit 141, and program number assignment information for preparing composite information by the frame assemblies only is output to the composite information preparation unit 141 by the frame assembly synchronizing unit 140. Then, the frame assembly read from the third buffer is held.

Further, when time information of the frame assembly read from the third buffer is advanced, only frame assemblies read previously from the buffer 137 and the buffer 138 are output by the frame assembly extraction unit 139 to the composite information preparation unit 141, and program number assignment information for preparing composite information by the frame assemblies only is output to the composite information preparation unit 141. Then, the frame assembly read from the third buffer is nullified.

The composite information preparation unit 141 prepares composite information based on stream data read by the frame assembly extraction unit 139, program number assignment information input from the frame assembly synchronizing unit 140, and synchronization information, on a frame assembly group basis composed of frame assemblies of the same time, performs multiplexing using the stream data, and delivers the multiplexed stream data to the writing unit 142. On this occasion, when the stream data are same-time data from two or more than two cameras, the composite information preparation unit 141 delivers (outputs) the stream data alternately to the writing unit 142 on a frame assembly basis so that the same time data may become continuous.

A method of preparing composite information will be explained below.

First, the stream taken out from each of the buffers includes a camera identification packet ID, image data packet ID, and audio data packet ID, as shown in FIG. 2. These packet IDs are taken out and program assignment is carried out based on the camera identification packet ID. As for the method of program assignment, for example, a program is assigned in increasing order of ID number indicated by the camera identification packet ID. Following this, data in which assigned program number information and packet ID are associated with each other is prepared.

As synchronization information used for preparation of composite information by the composite information preparation unit 141, for example, time information included in the frame assembly identification packet transmitted from the cameras 110, 120, . . . is used.

The composite information preparation unit 141 first decomposes the frame assemblies transmitted from the cameras 110, 120, . . . into smaller units, for example, PES packet units, and assigns a packet identifier (PID) to each unit.

Next, the composite information preparation unit 141 prepares a table that stores packet information included in the stream received from one camera which is, for example, the camera 110. Similarly, the composite information preparation unit 141 prepares tables for the streams received from the other cameras 120, . . .

Further, the composite information preparation unit 141 assigns a packet identifier also to each of the prepared tables, prepares a table for identifying the packet information in the prepared table from the packet identifier, and adds the table to a front of the composite information. On this occasion (when the packet assembly (table) shown last time is prepared), the composite information preparation unit 141, based on synchronization information, which is, for example, time information included in the frame assembly identification packet transmitted from the cameras 110, 120, . . . , assigns the stream received from different cameras 110, 120, . . . of the same time as different channel (program) data of the same time.

The writing unit 142 writes (records) stream data including composite information to the recording medium 143 on a frame assembly basis in the order of output from the composite information preparation unit 141. On this occasion, since recorded data are passed on a frame assembly basis from the frame assembly extraction unit 139 to the writing unit 142, the stream data is written in an interleaved form on a frame assembly basis when recorded to the recording medium 143.

Referring now to FIG. 4 showing composition of the data recorded to the recording medium 143, composition of the recorded data and composite information prepared by the composite information preparation unit 141 will be explained.

Figures 4A, 4B, 4C:
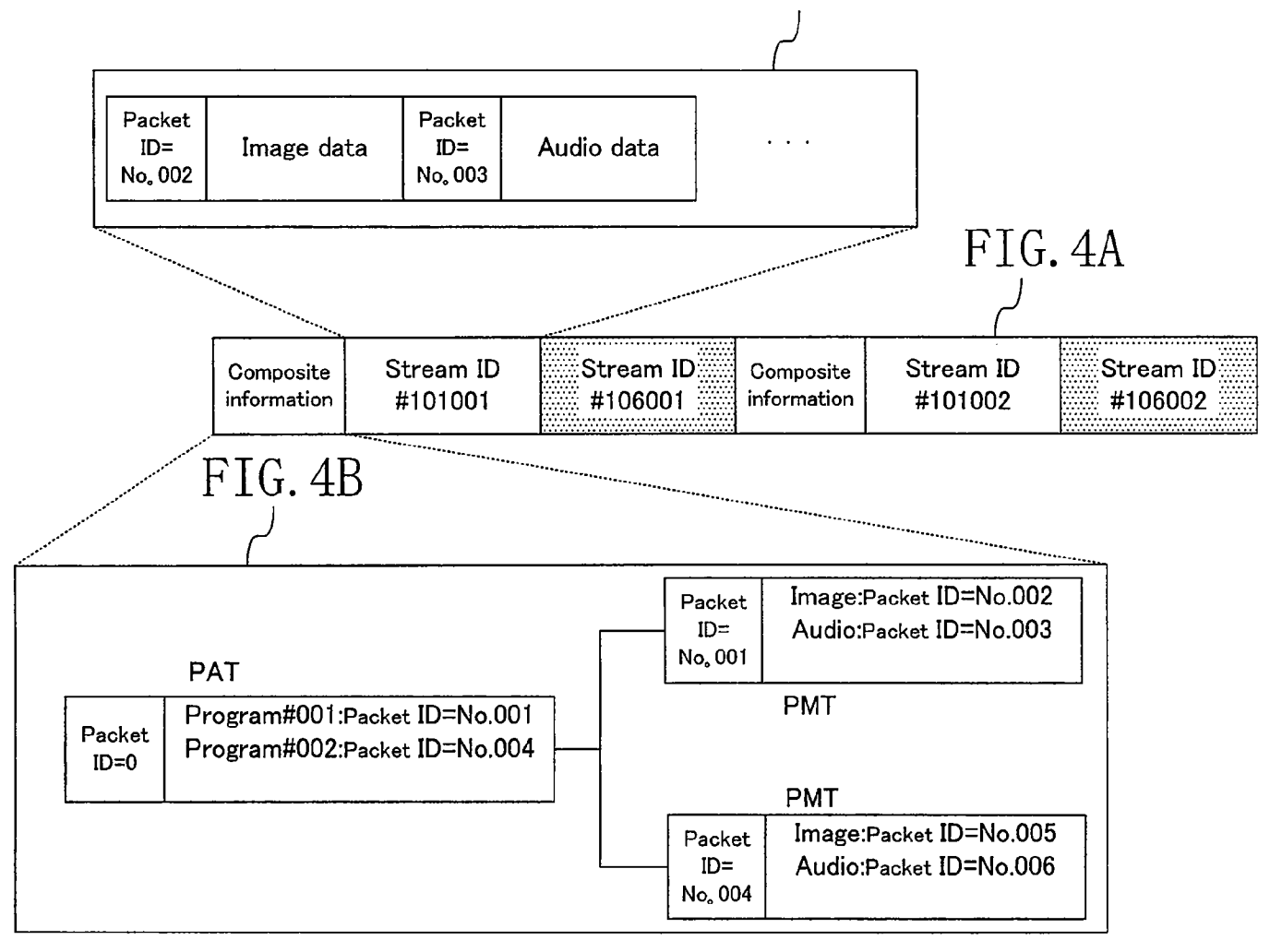

For example, when the stream data of the camera 110 and the camera 120 are recorded in the recording medium 143, supposing that the first frame assembly of the camera 110 is represented by stream ID#101001 and that the first frame assembly of the camera 120 is represented by stream ID#106001, then the data composition recorded to the recording medium 143 is recorded in the order of: composite information, stream ID#101001, stream ID#106001, as shown in FIG. 4A. The composite information on this occasion is as shown in FIG. 4B. In FIG. 4B, information for identifying packet ID of PMT of stream data of each camera 110, 120, . . . is allocated to PAT of packet ID=0. Here, for example, stream data of the camera 110 is assigned to the program number #001, and stream data of the camera 120 is assigned to the program number #002. In the PAT, packet ID of PMT of the camera 110 and packet ID of PMT of the camera 120 are written. Further, in the PMT information of each camera, packet ID of image data and packet ID of audio data of stream of the camera are written.

As mentioned above, the recording server 130 according to Embodiment 1 of the present invention performs judgment, based on time information, as to whether stream data transmitted from a plurality of different cameras are stream data of the time same as that of stream data transmitted previously. If there are a plurality of stream data of the same time, a program number is allocated to each of the stream data, SI information or PSI information used in the MPEG2-TS standard are prepared so that the SI information or PSI information can be recorded to the medium 143 in an interleaved form on a frame assembly basis. When data recorded in the recording medium 143 is reproduced using a usual reproduction machine capable of decoding stream data that is in compliance with MPEG2-TS, outputs of same time stream data from a plurality of cameras can be reproduced and viewed by switching in a seamless manner as if to switch channels.

Embodiment 2

A record reproducing system according to Embodiment 2 of the present invention includes a camera 110, a plurality of cameras 120, . . . each having a composition equivalent to that of the camera 110, and a recording server 230. The cameras 110, 120, are connected to the recording server 230 via a network. Composition of each of cameras 110, 120, . . . , connection relationship between cameras 110, 120, . . . , network, and the recording server 230 are same as those of the recording system of Embodiment 1 and therefore, illustrations are omitted here.

Figure 5:
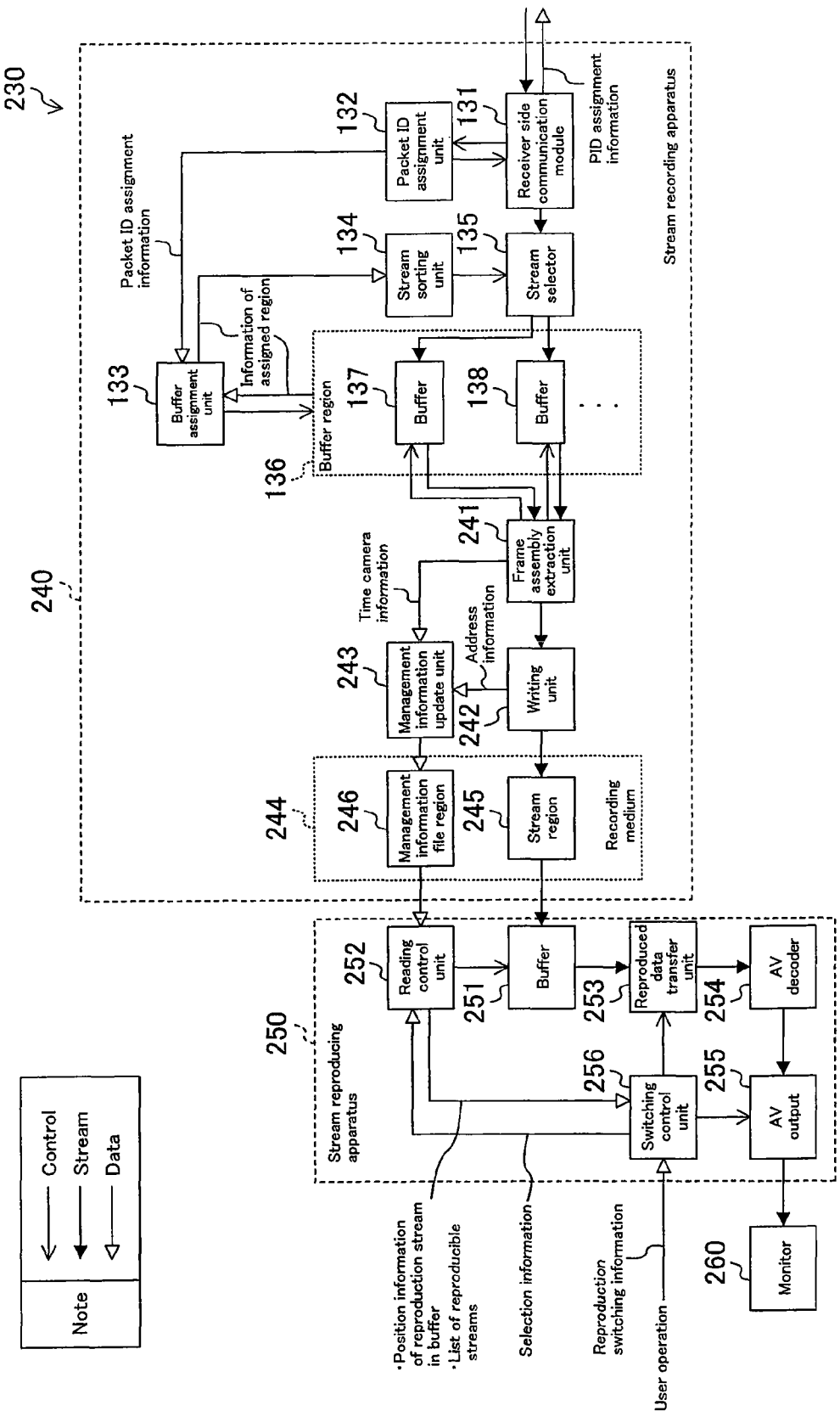
FIG. 5 is a block diagram showing composition of a recording server 230 according to Embodiment 2.

Further, the recording server 230 includes, as shown in FIG. 5, a stream recording apparatus 240, a stream reproducing apparatus 250, and a monitor 260.

The stream recording apparatus 240 includes the receiver side communication module 131, the packet ID assignment unit 132, the buffer assignment unit 133, the stream sorting unit 134, the stream selector 135, the buffer region 136, a frame assembly extraction unit 241, a writing unit 242, a management information update unit 243, and the recording medium 244. In the buffer region 136 are provided the buffers 137, 138, . . . . The recording medium 244 has the stream region 245 and a management information file region 246.

The stream reproducing apparatus 250 includes the buffer 251, a reading control unit 252, a reproduced data transfer unit 253, an AV decoder 254, an AV output 255, and a switching control unit 256.

In the present embodiment, the packet ID assignment unit 132 is designed, as shown in FIG. 6, to assign one packet to each of the cameras 110, 120, . . . , and causes the receiver side communication module 131 to transmit the assigned packet ID to a corresponding camera.

Operation of each unit when the camera 110 or the camera 120 is connected to the recording server 230 via a network, and operation after the time when the camera 110 or the camera 120 starts take-in (recording) of analog image data and analog audio data until data based on these data are sorted to each of the buffers 137, 138, . . . in the buffer region 136 are identical with operation of each unit in Embodiment 1.

Operation of each unit from the time when the frame assembly extraction unit 241 takes out a frame assembly from either of the buffers 137, 138, . . . until the data thus taken out is recorded to the recording medium 244 will be explained below.

The frame assembly extraction unit 241 monitors status of each of the buffers 137, 138, . . . , reads one buffer from the frame assembly identification packet at a front of the frame assembly down to the end thereof, and upon detection of another frame assembly identification packet, starts reading from a buffer assigned to a different camera. Further, the frame assembly extraction unit 241 extracts, from the front frame assembly identification packet at the front of the read frame assembly, time information indicating the time when the stream is recorded and packet ID that is information for identifying the camera, and delivers the time information and the packet ID to the management information update unit 243. Following this, the frame assembly extraction unit 241 delivers stream data to the writing unit 242.

The writing unit 242 records (writes) the stream data received from the frame assembly extraction unit 241 to the stream region 245 of the recording medium 244. In recording of the stream data, the writing unit 242 delivers to the management information update unit 243 record region information indicating the start address of a region recorded and recording capacity information indicating record size.

The management information update unit 243 prepares, on the basis of a frame assembly written to the stream region 245, data that associates with each other the time information of the frame assembly, a packet ID indicating which of cameras has output the frame assembly (camera identification information), and record region information indicating the record position of the frame assembly in the recording medium 244 (record position information), and updates a management information table as shown in FIG. 7. This management information table is recorded in the management information file region 246 of the recording medium 244. When the management information table is not present in the management information file region 246 of the recording medium 244, one is newly prepared and the prepared management information table is written to the management information file region 246. Details of the management information table will be explained later.

Next, operation of each unit when data recorded in the recording medium 244 is reproduced will be explained.

The reading control unit 252 of the stream reproducing apparatus 250, when in reproducible state (e.g., power is ON and a management information table is available), reads a management information table from the management information file region 246 of the recording medium 244, and delivers information indicating a list of stream data currently reproducible to the switching control unit 256. The list of stream data currently reproducible has a composition, for example, shown in FIG. 8.

The switching control unit 256 delivers the information indicating a list of stream data currently reproducible to the AV output 255.

The AV output 255 causes the monitor 260 to display the list of stream data currently reproducible. The monitor 260 is composed of, for example, OSD (On-Screen Display) or the like.

A viewer visually confirms the list of stream data currently reproducible displayed on the monitor 260 and can select any image the viewer desires to take a look. Selection information indicating which stream data is being selected is acquired by the switching control unit 256.

The switching control unit 256 delivers (outputs) the selection information to the reading control unit 252.

The reading control unit 252 executes controls, based on the selected stream data and information of the management information table, so that same time stream data recorded by a different camera from the one for the selected stream data is read from the stream region 245 of the recording medium 244 to the buffer 251. When recording is performed in the aforementioned processing, in the stream region 245 of the recording medium 244, stream data are randomly arranged on a frame assembly basis as shown in FIG. 9. Then, the stream data are read on a frame assembly basis in an interleaved form and are disposed in advance on the buffer 251 (reproducing buffer) as shown in FIG. 10. That is, the reading control unit 252, based on the selection information output by the switching control unit 256, reads alternately a plurality of frame assemblies of the same time from the recording medium 244 to the buffer 251. Arrangement in the buffer 251 in the form as shown in FIG. 10 is for the purpose of allowing seamless switching of reproduced steam data according to a switching instruction of reproduced steam data from the viewer. The reading control unit 252 further prepares stream list information as shown in FIG. 11 indicating information of stream data currently reproducible, arrangement position information indicating where on the buffer 251 is disposed each stream data, and time information of each stream data, and delivers the stream list information to the switching control unit 256. The stream list information is information indicating a list of same time stream data read in the buffer and recorded by different cameras.

The switching control unit 256 controls the reproduced data transfer unit 253 so that the stream data currently selected by the viewer are transferred. Further, the switching control unit 256 delivers the stream list information from the reading control unit 252 to the AV output 255.

The reproduced data transfer unit 253 reads stream data shown by the selection information from the buffer 251 and transfers the stream data to the AV decoder 254.

The AV decoder 254 decodes the stream data transferred from the reproduced data transfer unit 253 and delivers the decoded stream data to the AV output 255.

The AV output 255 outputs decoded data to the monitor 260. That is, the AV output 255 causes the monitor 260 to display (output) an image based on the decoded data. In this instance, based on the information indicating a list of stream data from the switching control unit 256, AV output 255 also causes the monitor 260 to display the list.

A viewer selects images the viewer desires to take a look based on a list of same time stream data recorded by different cameras, which is displayed on the monitor 260, and are able to switch the reproduced image to the selected image.

Composition of the management information table shown in FIG. 7 will be explained below.

The management information table has a table structure as shown in FIG. 7. In the management information table, stream information, time information, address of the recording medium in which a stream is recorded are associated with each other. Specifically, the stream information is an ID assigned on a frame assembly basis. Further, the time information is described to the accuracy (unit) that enables discrimination between frame assemblies of the same camera. Further, in the case of HDD (Hard Disk Drive), physical address or the like is described as the address. The form of the management information table explained here is one example and it is not particularly limited insofar as reference can be made to, among streams, streams of the same time shot by different cameras.

Thus, by the stream recording apparatus 240 of the present invention, image data transmitted from a plurality of different cameras are recorded on a frame assembly basis in association with time data. Accordingly, the stream reproducing apparatus 250, when reproducing the recorded data, reads image data to be output and same time image data shot by another camera as the image data in advance, based on the association, and maintains time synchronization of images by different cameras. Thus, a viewer can switch displayed images in a seamless manner.

Embodiment 3

When stream data recorded by the recording server 130 of Embodiment 1 is reproduced by a usual reproduction machine capable of decoding MPEG2-TS, stream data of the same time as the time of the stream data to be reproduced was required to be read from the recording medium 143 and input to a device that decodes MPEG2-TS. This necessitated preparation of a buffer (reproduction buffer) for temporarily holding stream data in order for reading from the band of bus and recording medium by an amount equivalent to the capacity of same time stream data. While in the record producing system according to Embodiment 3, management information of the recorded data is prepared during recording, and during reproduction, only necessary stream data is read according to the management information, thereby reducing bus load and capacity of the reproduction buffer used.

The record reproducing system according to Embodiment 3 of the present invention includes the camera 110, a plurality of cameras 120, . . . each having an identical composition as that of the camera 110, and the recording server 330. The cameras 110, 120, . . . are connected to the recording server 330 via a network.

Composition of each camera 110, 120, . . . , and a connection relationship between cameras 110, 120, . . . , network, and recording server 330 is the same as that of the recording system of Embodiment 1 and therefore, illustrations are omitted here.

Figure 12:
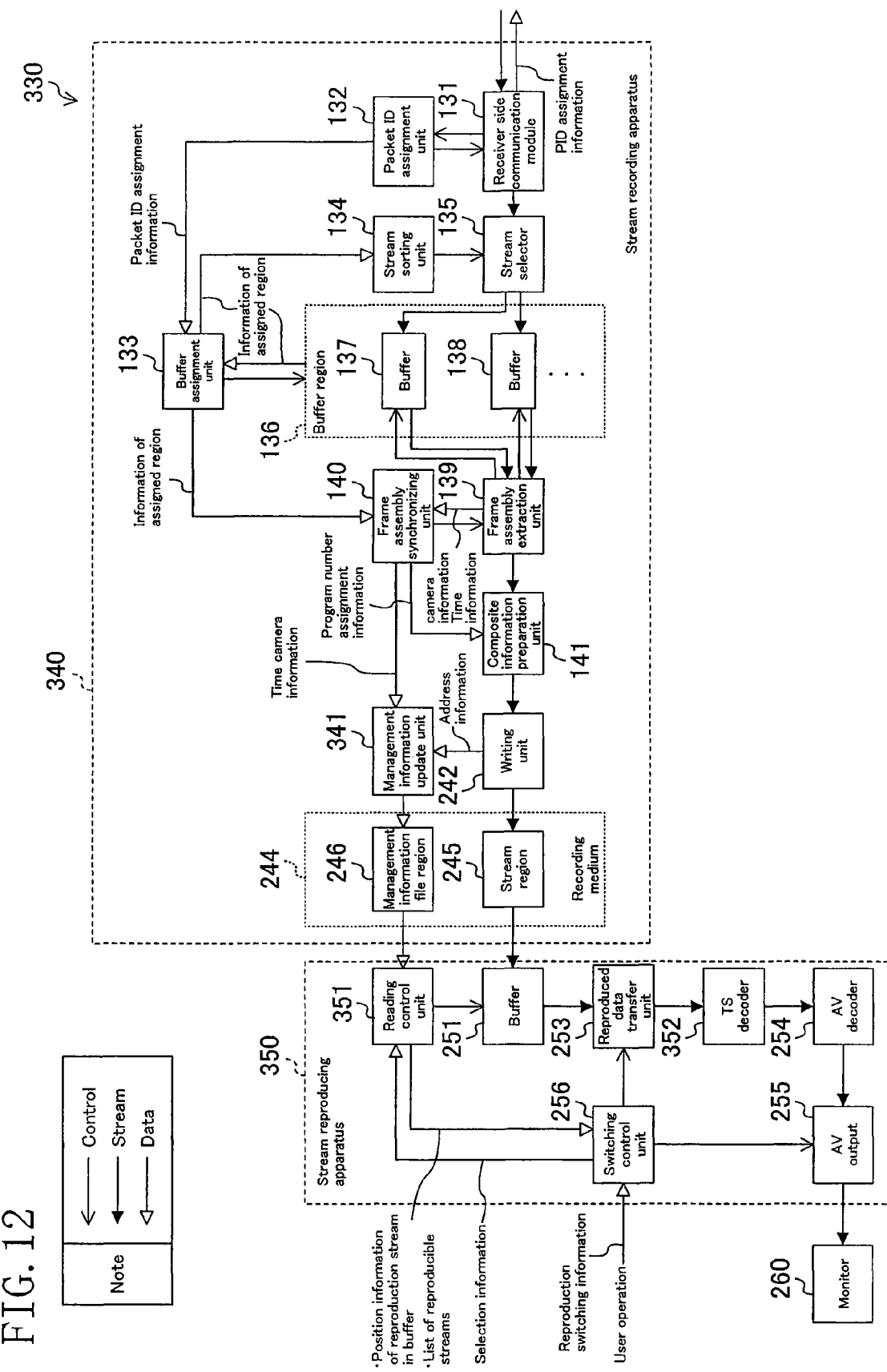
FIG. 12 is a block diagram showing composition of a recording server 330 according to Embodiment 3.

Further, the recording server 330 includes, as shown in FIG. 12, a stream recording apparatus 340, a stream reproducing apparatus 350, and the monitor 260.

The stream recording apparatus 340 includes the receiver side communication module 131, the packet ID assignment unit 132, the buffer assignment unit 133, the stream sorting unit 134, the stream selector 135, the buffer region 136, the frame assembly extraction unit 139, the frame assembly synchronizing unit 140, the composite information preparation unit 141, the writing unit 242, a management information update unit 341, and the recording medium 244. In the buffer region 136, the buffers 137, 138, . . . are provided. The recording medium 244 has the stream region 245 and the management information file region 246.

The stream reproducing apparatus 350 includes the buffer 251, a reading control unit 351, the reproduced data transfer unit 253, a TS decoder 352, the AV decoder 254, the AV output 255, and the switching control unit 256.

In the recording apparatus portion, composition of the recording server 330 including the receiver side communication module 131, the packet ID assignment unit 132, the stream selector 135, the stream sorting unit 134, the buffer region 136, the buffer 137 assigned individually to the camera 110, the buffer 138 assigned individually to the camera 120, the buffer assignment unit 133, the frame assembly extraction unit 139, the frame assembly synchronizing unit 140, and the composite information preparation unit 141 is the same as that of the recording server 130 of Embodiment 1.

The recording apparatus portion is different from the composition of the recording server 130 of Embodiment 1 in that the management information update unit 341 is provided, which receives time information of a frame assembly and camera information (packet ID) from the frame assembly synchronizing unit 140, receives address information indicating the writing position of the frame assembly in the recording medium 244 from the writing unit 242, associates these pieces of information, and updates management information.

Referring now to the drawings, overall operation will be explained.

Operation of each unit when the camera 110 or camera 120 is connected to the recording server 330 via a network, operation of each unit from the time when the camera 110 or camera 120 starts taking-in (recording) of analog image data and analog audio data until stream data based on these data are received by the receiver side communication module 131 and sorted to each of the buffers 137, 138, . . . inside the buffer region 136, the frame assembly synchronizing unit 140 controls the frame assembly extraction unit 139 while maintaining synchronization based on time information indicating the recording time of the stream data held in each buffer, and the frame assembly is delivered to the composite information preparation unit 141 are the same as those explained in Embodiment 1.

Here, operation related to a frame assembly recorded to the recording medium 244 via the composite information preparation unit 141 and the writing unit 242 will be explained.

The frame assembly synchronizing unit 140 holds a frame assembly identification packet taken from each of the buffers 137, 138, . . . and delivers the packet data to the management information update unit 341.

The frame assembly extraction unit 139 delivers a frame assembly of the same time extracted from the buffers 137, 138, . . . to the composite information preparation unit 141.

The composite information preparation unit 141 prepares composite information based on the frame assembly received from the frame assembly extraction unit 139 and the program assignment information received from the frame assembly synchronizing unit 140, performs multiplexing using the frame assembly, and then delivers the composite information to the writing unit 242.

The writing unit 242 writes the frame assembly having the received composite information to the stream region 245 of the recording medium 244, and delivers address information indicating the address to be written to the management information update unit 341.

The management information update unit 341 performs association of the frame assembly and the writing position based on camera information received from the frame assembly synchronizing unit 140, packet data having time information, and address information received from the writing unit 242, prepares a management information table, and records the table to the management information file region 246. That is, the management information table is management information that associates with each other camera information indicating which of the cameras has output each of the frame assemblies, time information of each frame assembly, and address information (recording position information) indicating writing position (recording position) of each frame information in the recording medium 244.

By the aforementioned processing, a data table in which the frame assembly and writing position of the frame assembly are associated with each other is recorded in the recording medium 244.

Next, operation when the stream data recorded to the recording medium 244 as mentioned is reproduced will be explained.

The reading control unit 351, when in reproducible state (e.g., power is ON and a management information table is available), reads the management information table from the management information file region 246 of the recording medium 244, and delivers information indicating a list of stream data currently reproducible to the switching control unit 256.

The switching control unit 256 delivers information indicating the list of stream data currently reproducible to the AV output 255.

The AV output 255 causes the monitor 260 to display the list of stream data currently reproducible. The monitor 260 is composed of, for example, OSD (On-Screen Display) or the like.

A viewer visually confirms the list of stream data currently reproducible displayed on the monitor 260 and can select any image the viewer desires to take a look. Selection information indicating which stream data is being selected is acquired by the switching control unit 256.

The switching control unit 256 delivers (outputs) the selection information to the reading control unit 351.

The reading control unit 351, based on the management information file, reads composite information corresponding to the selected stream data from the stream region 245 to the buffer 251. To the buffer 251, only data required at reproduction, i.e., stream data shown by the selection information are read as shown in FIG. 7. Further, the reading control unit 351, based on the management information file, prepares a list of reproducible streams of the same time, and sets the list in the switching control unit 256. Since the recording server 330 of the present embodiment records frame assemblies of the same time in the recording medium 244 in adjacent positions, switching of frame assemblies to be reproduced and displayed between the frame assemblies of the same time can be carried out in a seamless manner.

The switching control unit 256 controls the reproduced data transfer unit 253 and causes it to transfer selected stream data from the buffer 251 to the TS decoder 352.

The reproduced data transfer unit 253 causes the stream data red to the buffer 251 to be transferred to the TS decoder 352.

The TS decoder 352 (filter), based on composite information, extracts PES (Packetized Elementary Stream) (AV (Audio Video) information) and delivers PES to the AV decoder 254.

The AV decoder 254 decodes PES and delivers it to the AV output 255.

The AV decoder 255 outputs the stream data (image data based on AV information) decoded by the AV decoder 254 to the monitor 260 and causes it to display an image. Further, based on information indicating a list of currently reproducible stream data received from the switching control unit 256, the AV decoder 255 also causes the monitor 260 to display the list.

Next, operation of each unit when reproduction switching request is received during reproduction will be explained.

First, a viewer selects stream data the viewer desires to reproduce based on the list of currently reproducible stream data displayed on the monitor 260. Specifically, input operation by the viewer for selection of the stream data to be reproduced is carried out to the switching control unit 256.

The switching control unit 256 detects the operation by the viewer, acquires selection information indicating which stream is selected, and delivers the selection information to the reading control unit 351.

The reading control unit 351 once nullifies the stream data in the buffer 251 and, based on the management information file, reads composite information corresponding to the selected stream data from the stream region 245 to the buffer 251.

Following this, the stream data selected are reproduced. Operation of each unit during reproduction is the same as those mentioned previously.

Thus, the recording server 330 of Embodiment 3 records alternately image data transmitted from a plurality of different cameras on a frame assembly basis and prepares a table that associates time data and recording position with each other on a frame assembly basis. Thus, at reproduction, only stream data necessary for reproduction is read based on the table thus prepared, and are delivered to various decoders. Therefore, compared to the case of Embodiment 1 where data recorded by the recording server 130 is reproduced, a reduction in bus band is much easier.

Embodiment 4

In order to maintain time synchronization between stream data of different cameras, the recording server 130 of Embodiment 1 is designed, when a different camera frame assembly of the time same as that of frame assembly that is already recorded, to nullify the frame assembly. In Embodiment 4, data nullification is prevented when time synchronization is maintained between stream data of different cameras.

Figure 13:
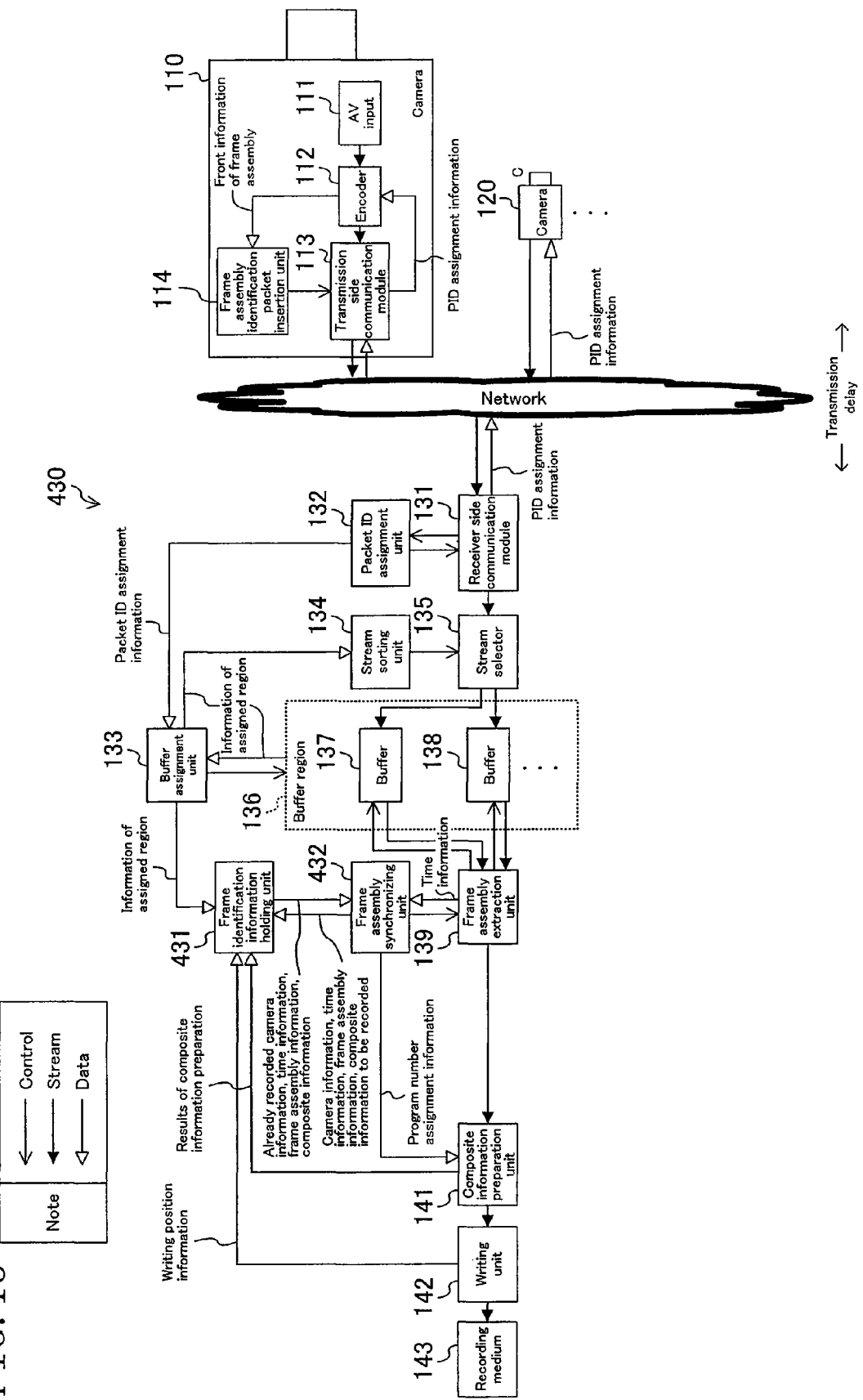
FIG. 13 is a block diagram showing composition of the recording system according to Embodiment 4.

The recording system according to Embodiment 4 of the present invention includes, as shown in FIG. 13, the camera 110, a plurality of cameras 120, . . . each having the composition identical to that of the camera 110, and a recording server 430. The cameras 110, 120, . . . are connected to the recording server 430 via a network.

Composition of the recording server 430 is different from the recording server 130 of Embodiment 1 in that the recording server 430 includes the frame identification information holding unit 431 for managing frame assembly information and writing position in association with each other, and the information held in the frame identification information holding unit 431 is referred by a frame assembly synchronizing unit 432. The rest of the composition is the same as that of the recording server 130 of Embodiment 1.

The frame identification information holding unit 431 holds, for each of frame assemblies recorded in the recording medium 143, camera identification information (information delivery apparatus identification information) indicating which of the cameras has output the frame assembly, time information, and writing position information indicating the writing position in the recording medium 143, and judges whether a frame assembly of the same time as that of the frame assembly taken in by the frame assembly extraction unit is recorded in the recording medium 143.

Referring to the drawings, overall operation will be explained.

Operation of each unit when the camera 110 or camera 120 is connected to the recording server 430 via the network, operation of each unit from the time when the camera 110 or camera 120 start taking-in (recording) of analog image data and analog audio data until stream data based on these data is received by the receiver side communication module 131 and sorted to each of buffers 137, 138, . . . inside the buffer region 136, the frame assembly synchronizing unit 432 controls the frame assembly extraction unit 139 while maintaining synchronization based on time information indicating the recording time of the stream data held in each of buffers, and the frame assembly is delivered to the composite information preparation unit 141 are the same as those explained in Embodiment 1.

Subsequently, operation related to a frame assembly recorded to the recording medium 143 via the composite information preparation unit 141 and the writing unit 142 will be explained. First, a case where the camera 110 takes in (recording) analog image data and analog audio data is explained, and then, a case where, in addition to the camera 110, the camera 120 starts taking-in (recording) of data is explained.

The frame assembly extraction unit 139 reads one buffer from a frame assembly identification packet to the end of the frame assembly. In this case, since the frame assembly is transmitted from the camera 110, reading is carried out from the buffer 137. Next, the frame assembly extraction unit 139 delivers the frame assembly identification packet to the frame assembly synchronizing unit 432.

Next, the frame assembly synchronizing unit 432 delivers the frame assembly identification packet to the frame identification information holding unit 431.

The frame identification information holding unit 431 checks (judges), based on the frame assembly identification packet delivered by the frame assembly synchronizing unit 432, whether a frame assembly of the same time by another camera is already recorded in the recording medium 143. In this explanation, since a frame assembly of the same time by another camera already recorded is not present, information of the frame assembly identification packet is held by a form, for example, shown in FIG. 14 and information indicating that a frame assembly by another camera is not present is delivered to the frame assembly synchronizing unit 432.

The frame assembly synchronizing unit 432 controls the frame assembly extraction unit 139 so as to deliver data to the composite information preparation unit 141 and delivers program number assignment information necessary for assigning a channel (angle) to the composite information preparation unit 141.

The frame assembly extraction unit 139 delivers the frame assembly read from the buffer 137 to the composite information preparation unit 141.

The composite information preparation unit 141 prepares composite information as in Embodiment 1. Then, the composite information preparation unit 141 delivers results of composite information preparation to the frame identification information holding unit 431. Then, the composite information preparation unit 141 delivers the frame assembly with the composite information to the writing unit 142.

The frame identification information holding unit 431 adds results of composite information preparation thus received to information held as shown in FIG. 14 and holds the information in the form shown in FIG. 15.

The writing unit 142 writes the frame assembly with the composite information to the recording medium 143. On this occasion, the writing unit 142 causes the writing position information to be fed back to the frame identification information holding unit 431.

The frame identification information holding unit 431 registers, in the form shown in FIG. 16, the writing position information (address information) to the table of corresponding frame assembly of corresponding time.

Next, operation when the camera 120 starts recording will be explained. As a prerequisite, the frame assembly from the camera 110 with the same time information as that of data that is taken in by the camera 120 is already recorded in the recording medium 143 before the frame assembly of the camera 120 reaches the recording server.

Operation before the stream data transmitted from the camera 120 reaches the buffer 138 is the same as that of Embodiment 1.

The frame assembly extraction unit 139 reads one buffer from a frame assembly identification packet to the end of the frame assembly. In this case, since the frame assembly is transmitted from the camera 120, reading is carried out from the buffer 138. Next, the frame assembly extraction unit 139 delivers the frame assembly identification packet to the frame assembly synchronizing unit 432.

Next, the frame assembly synchronizing unit 432 delivers a frame assembly identification packet to the frame identification information holding unit 431.

The frame identification information holding unit 431 checks (judges), based on the frame assembly identification packet delivered by the frame assembly synchronizing unit 432, whether a different camera frame assembly of the time same as that of the frame assembly read by the frame assembly extraction unit 139 is already recorded. Since, by the prerequisite, the frame assembly acquired previously from the buffer 137 is already written to the recording medium 143, it is possible to detect the information from the table managed by the frame identification information holding unit 431. Next, data writing position information, camera identification information (packet ID), and results of composite information preparation of the data previously recorded to the buffer 137 are taken out from the table and are delivered to the frame assembly synchronizing unit 432. That is, for the different camera frame assembly of the same time already recorded, writing position information, camera identification information (packet ID), and results of composite information preparation are taken out.

The frame assembly synchronizing unit 432 receives the writing position information, camera identification information (packet ID), results of composite information preparation, and program number assignment information from the frame identification information holding unit 431 and delivers them to the composite information preparation unit 141.

The frame assembly extraction unit 139 delivers the frame assembly read from the buffer 138 to the composite information preparation unit 141.

The composite information preparation unit 141 re-prepares composite information from results of composite information preparation and program assignment information (information corresponding to which of the cameras has output the frame assembly of the same time) received from the frame assembly synchronizing unit 432, and packet ID (information corresponding to which of the cameras has output a new frame assembly) contained in the frame assembly received from the frame assembly extraction unit 139, and delivers the composite information to the writing unit 142 together with writing position information of the data recorded previously in the buffer 137.

The writing unit 142 writes the currently recorded frame assembly in a region adjacent to the writing position of the previously recorded data in the buffer 137. Further, the writing unit 142 overwrites the composite information prepared at previous recording with the currently prepared composite information. As a result of writing by the writing unit 142, the recorded stream data is as shown in FIG. 4 of Embodiment 1, where the frame assemblies from the camera 110 and the frame assemblies from the camera 120 are recorded alternately in an interleaved form on the system file.

Next, operation when the camera 120 starts data take-in will be explained while another different prerequisite is defined. In the following explanation, it will be supposed that the frame assembly from the camera 110 with the same time information as that of the data that is taken in by the camera 120 is already recorded in the recording medium 143 before the stream data from the camera 120 reaches the image recording server, and that the next frame assembly of the camera 110 is sorted to the buffer 137.

The frame assembly extraction unit 139 reads one buffer from a frame assembly identification packet to the end of the frame assembly. Then, the frame assembly extraction unit 139 delivers the frame assembly identification packet of the camera 120 to the frame assembly synchronizing unit 432. According to the prerequisite, after a frame assembly (data timewisely after the frame assembly from the camera 120) from the buffer 137 (from camera 110) is read, frame assembly identification packet of the buffer 138 is read and delivered to the frame assembly synchronizing unit 432.

The frame assembly synchronizing unit 432 compares the time information of the frame assembly previously taken out from the buffer 138 with the time information of the frame assembly currently taken out from the buffer 137. Since, by the prerequisite, time of the frame assembly currently taken out from the buffer 137 is ahead of the time of the frame assembly taken out from the buffer 138, the frame assembly is first taken out from the buffer 138, and the frame assembly thus taken out is written to the recording medium 143 by operation of each unit as explained before. After that, if no data is present in the buffer 138, the data taken out from the buffer 137 is written directly to the recording medium 143 by operation of each unit similar to the aforementioned case where the recording is made by the camera 110 only.

Thus, when time synchronization is maintained between frame assemblies of each of the cameras, even if the frame identification information holding unit 431 manages frame assembly information and data of the time same as that of a frame assembly already recorded is input in a delayed manner to the frame assembly extraction unit 139, the recording server 430 of the present embodiment adds the delayed data to the recording medium 143 based on the frame assembly information, thereby re-structuring the composite information. Therefore, the delayed data is recorded without being nullified.

Embodiment 5

In Embodiments 1 through 4, each of the cameras 110, 120, . . . generates a frame assembly identification packet for identifying a frame assembly and transmits the packet so that the frame assembly in a stream is extracted at the recording server side. This caused frame assembly identification packets to flow from a plurality of cameras on a frame assembly basis, resulting in the problem of increased load for the network.

In the present embodiment, explanation will be made of a recording system that enables a frame assembly in a stream to be identified at the recording server side without flowing the frame assembly identification packet to the network.

Figure 17:
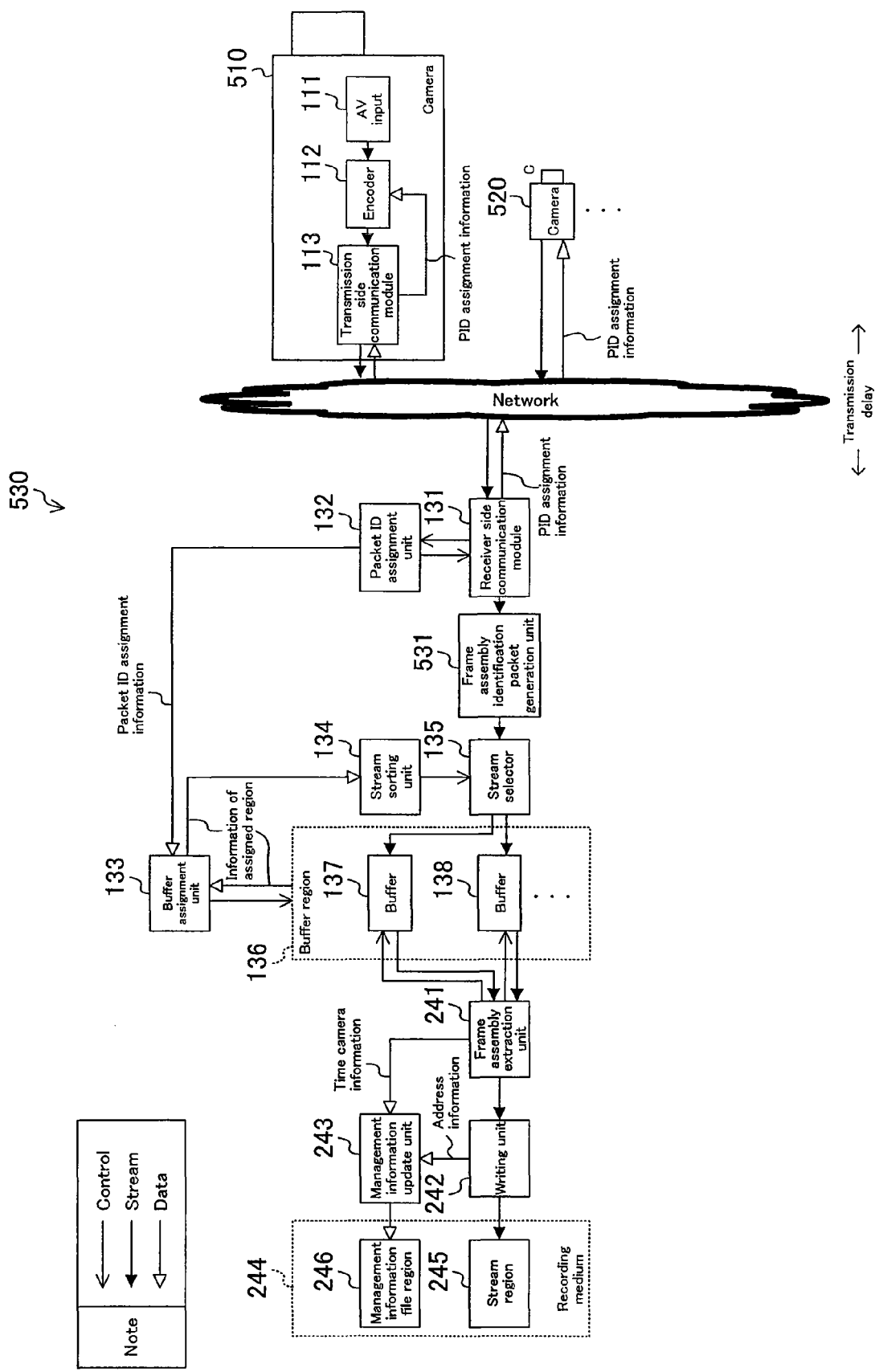
FIG. 17 is a block diagram showing composition of recording system according to Embodiment 5.

The recording system according to Embodiment 5 of the present invention includes, as shown in FIG. 17, a plurality of cameras 510, 520, . . . and a recording server 530. The cameras 510, 520, . . . are connected to the recording server 530 via a network.

The cameras 510, 520, . . . are different from cameras 110, 120, . . . in Embodiments 1 through 4 in that each of the cameras 510, 520 is not provided with the frame assembly identification packet insertion unit 114. Further, the recording server 530 is different from the stream recording apparatus 240 of Embodiment 2 in that the recording server 530 has a frame assembly identification packet generation unit 531 at a front stage of the stream selector 135. The rest of the composition is the same as that of the stream recording apparatus 240 of Embodiment 2.

Referring to the drawings, operation of each unit will be explained. Operation of each unit at camera insertion and removal is same as that explained above in Embodiment 1, and therefore will be omitted here. In the present embodiment, operation during recording will be explained. Further, operation during recording which is the same as conventional operation will be omitted.

As mentioned before, the camera 510 does not have the frame assembly identification packet insertion unit 114. Accordingly, a packet sent by the transmission side communication module 113 to the network after data take-in is started does not include a frame assembly identification packet and includes an AV stream only. That is, the transmission side communication module 113 outputs packetized data packetized by the encoder 112.

To this end, the recording server 530 is provided with a frame assembly identification packet generation unit 531 so that frame assemblies recorded by each of the cameras are extracted from the buffer 137 and the buffer 138.

The frame assembly identification packet generation unit 531, upon receiving the aforementioned packet (packetized data) from the receiver side communication module 131, analyzes the contents of the packet, detects the beginning of the frame assembly, and extracts time information indicating the time when a front frame of the frame assembly is recorded.

The following description explains a case where the aforementioned packet is a TS packet according to the MPEG2-TS standard.

Upon receiving a TS packet, the frame assembly identification packet generation unit 531 acquires the value stored in a PID field in the TS packet header, and compares the value with the value of an image field of a packet ID of the packet ID assignment management table held by the packet ID assignment unit 132. When it is detected that the received TS packet is video, a PES packet is acquired from a payload field. Subsequently, a start code of the sequence header is searched in a packet data field of the PES packet. When the start code of the sequence header is detected, it is judged that the packet is a front of GOP, which is a frame assembly, and the aforementioned frame assembly identification packet is generated. In the frame assembly identification packet, the value of the camera identification field of the packet ID of the aforementioned packet ID assignment management table is stored in the packet field, and the value of the PTS field of the aforementioned PES packet is stored in the time information field. The frame assembly identification packet thus generated is transferred to the stream selector 135 prior to the TS packet. That is, the frame assembly identification packet generation unit 531 inserts the generated frame assembly identification packet to the packetized data output by the receiver side communication module 131 on a frame assembly basis.

Thus, in the recording system of the present embodiment, the recording server 530 is provided with the frame assembly identification packet generation unit 531 which, at the recording server side, analyzes the packet sent by the camera, detects beginning of the frame assembly, and generates the frame assembly identification packet, thereby reducing load of the network.

Meanwhile, the recording server 530 of the recording system of the present embodiment has such composition that the frame assembly identification packet generation unit 531 is added to the stream recording apparatus 240 of Embodiment 2. However, also in the recording system of Embodiment 1, the frame assembly identification packet generation unit 531 may be provided between the receiver side communication module 131 and the stream selector 135 of the recording server 130, so that the frame assembly identification packet is inserted to the data at the recording server 130 side instead of the cameras 110, 120, . . . side.

Embodiment 6

In Embodiment 1, explanation was made to a method for recording frame assemblies of the same time to a recording medium in an interleaved manner. However, with this method, writing to the recording medium is carried out on a frame assembly basis, and therefore, there is no guarantee that the frame assemblies are written to physically continuous regions. Therefore, when a recording medium requiring seeking of the head such as HDD and optical disk is used, there are cases where switching of reproduction does not take place smoothly during reproduction due to seeking delay.

In the present embodiment, explanation will be made of a recording server (recording apparatus) which records frame assemblies in physically continuous regions in order to reduce the seeking time during reproduction switching.

Figure 18:
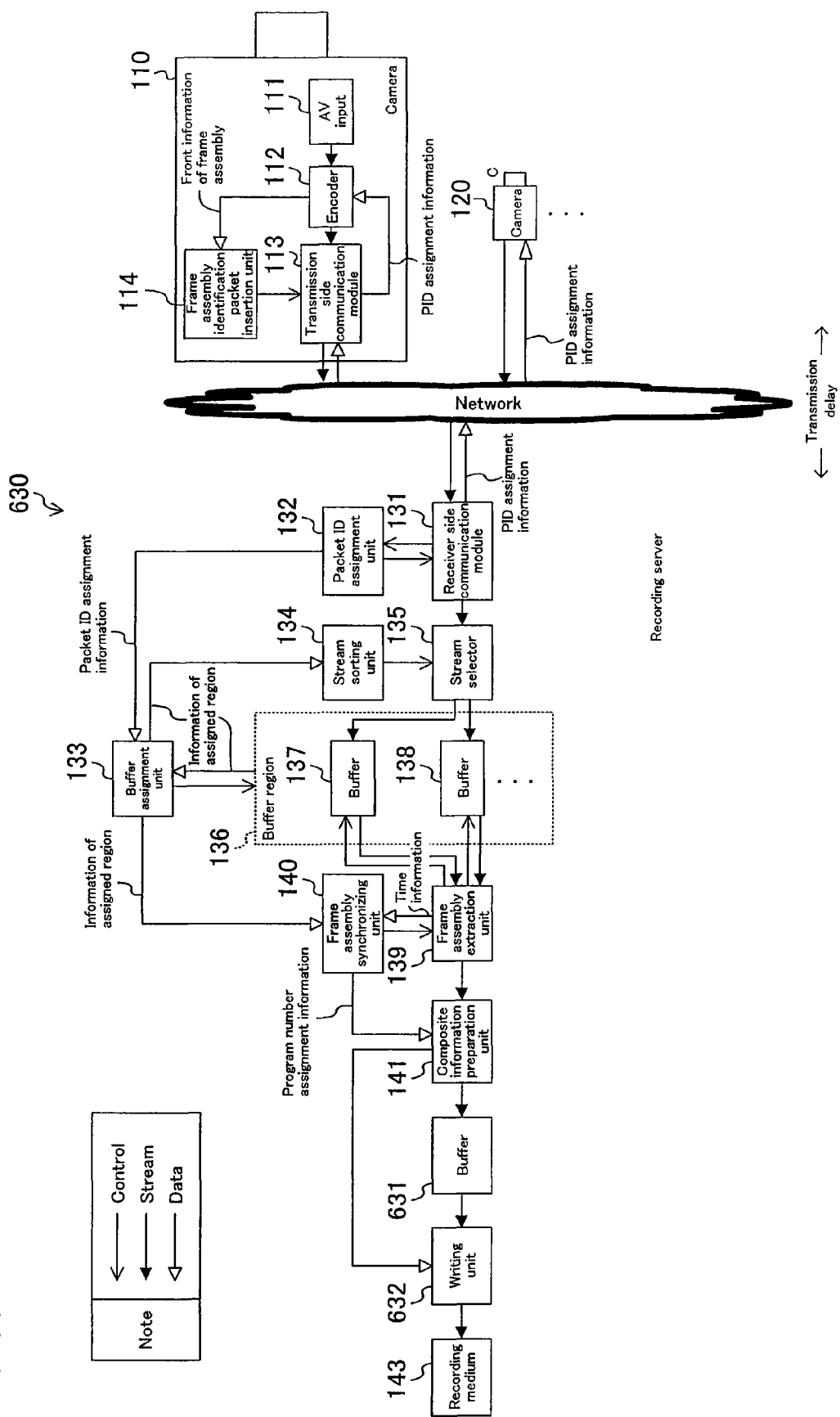
FIG. 18 is a block diagram showing composition of recording system according to Embodiment 6.

The recording system according to Embodiment 6 of the present invention includes, as shown in FIG. 18, the camera 110, a plurality of cameras 120, . . . each having an identical composition as that of the camera 110, and a recording server 630. The cameras 110, 120, . . . are connected to the recording server 630 via a network.

A difference in composition between the recording system of the present embodiment and the recording system of Embodiment 1 is that the recording server 630 is provided with a buffer 631 and a writing unit 632 instead of the writing unit 142. The rest of the composition of the recording system of the present embodiment such as composition of cameras 110, 120, . . . are the same as that of the recording system of Embodiment 1.

Referring to the drawings, operation of each unit will be explained below.

As mentioned previously, the composite information preparation unit 141 prepares composite information based on program number assignment information and alternately receives from the frame assembly extraction unit 139 a frame assembly (stream data including frame assembly identification packet) of each of the cameras. Further, the composite information preparation unit 141 transfers the composite information thus prepared and the received frame assembly to the buffer 631. On this occasion, composite information to become same time data and the frame assembly of each camera are subjected to buffering by the buffer 631 to become one bundle (data assembly), and when the bundle is accumulated (stored temporarily) in the buffer 631, the composite information preparation unit 141 notifies the writing unit 632 of an address on the buffer 631 where the bundle is stored and data capacity (size) of the bundle. That is, the composite information preparation unit 141, for a plurality of frame assemblies of the same time and bundle of data (data assembly) constituted of these composite information, outputs an address on the buffer 631 where the bundle is stored and data capacity of the bundle.

The writing unit 632 determines continuous regions (writing position) in the recording medium 143 to which the bundle is written, based on the address and data capacity of the buffer 631 received from the composite information preparation unit 141. That is, the writing unit 632 secures continuous physical regions in the recording medium 143. Then the writing unit 632 performs writing collectively in the regions.

Thus, the recording server 630 of the present embodiment is designed to perform buffering of frame assemblies of the same time from the cameras by the buffer 631, while in Embodiment 1, frame assemblies are extracted individually on a camera basis and are written to the recording medium 143. Therefore, frame assemblies of the same time from a plurality of cameras can be recorded in continuous regions secured on the recording medium 143. As a result, the seeking time for switching stream data to be reproduced to stream data from a different camera is shortened and switching of reproduction can be performed smoothly even if a recording medium requiring seeking of the head such as HDD or optical disk is used.

Embodiment 7

In Embodiment 2, the stream reproducing apparatus 250 for reproducing AV stream recorded together with a management information table is explained. However, with stream reproducing apparatus 250, when switching of cameras for recording by user operation is instructed, a stream to be sent to the AV decoder 254 is switched, the stream already transferred to the AV decoder 254 is reproduced and output, and therefore, display is not switched promptly for the switching instruction given by the user.

In the present embodiment, a stream reproducing apparatus which enables prompt switching of reproduction display in response to a switching instruction given by the user will be explained.

Figure 19:
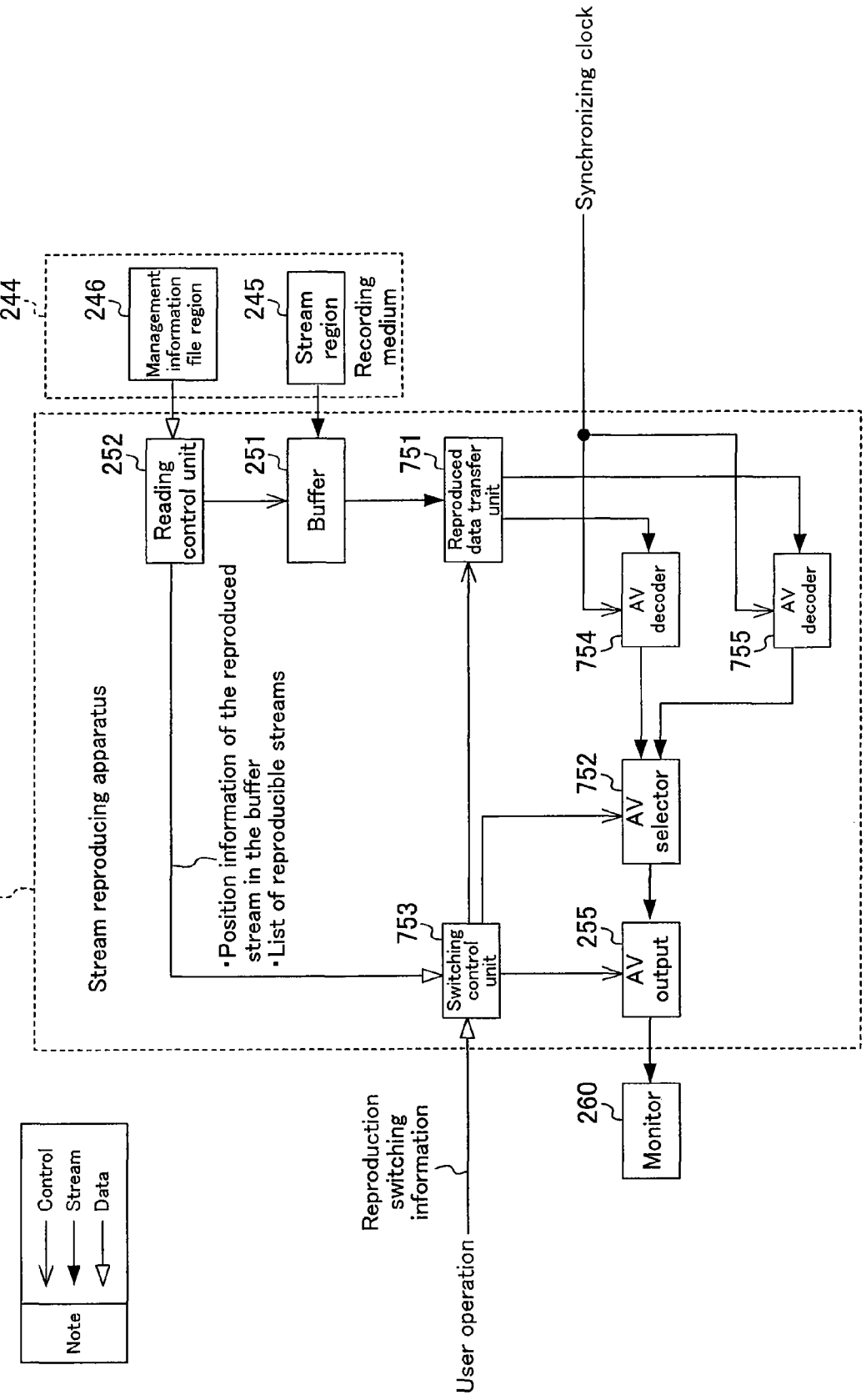
FIG. 19 is a block diagram showing composition of recording system according to Embodiment 7.

The record reproducing system according to Embodiment 7 of the present invention is provided with a stream reproducing apparatus 750 as shown in FIG. 19 instead of the stream reproducing apparatus 250 of Embodiment 2. The rest of the composition is the same as that of the record reproducing system of Embodiment 2.

The composition of the stream reproducing apparatus 750 is different from that of the stream reproducing apparatus 250 of Embodiment 2 in that the stream reproducing apparatus 750 is provided with a reproduced data transfer unit 751 instead of the reproduced data transfer unit 253, two AV decoders 754, 755 instead of the AV decoder 254, a switching control unit 753 instead of the switching control unit 256, and further provided with a AV selector 752 and a synchronizing clock generation unit (not shown). The rest of the composition of the recording system of the present embodiment is the same as that of the recording system of Embodiment 2.

The synchronizing clock generation unit generates a synchronizing clock and maintains synchronization between the two AV decoders 754, 755.

Referring to the drawings, operation of each unit will be explained hereafter.

Upon receiving from the reading control unit 252 information of a list of reproducible streams, the switching control unit 753 generates correspondence between streams and corresponding AV decoders 754, 755.

Here, it is supposed that AV decoders are mounted in a number more than the number of streams included in the list of stream, i.e., more than the number of cameras transmitting the streams, and that each AV decoder performs decode processing based on the same synchronizing clock generated by the synchronizing clock generation unit (not shown). The following description explains a case where two reproducible streams are present.

Generation of correspondence between the streams and AV decoders is carried out based on the AV decoder management table as shown in FIG. 20. The switching control unit 753, upon receiving information indicating a list of streams, searches (scans) sequentially a AV decoder management table and acquires the number of a AV decoder for which correspondence with a stream is not generated yet. Next, the switching control unit 753 records identification information of the stream in the stream column corresponding to the AV decoder number acquired.

Subsequently, the switching control unit 753, upon receiving from the reading control unit 252 position information of the reproduced stream in the buffer, compares the received stream identification information with the AV decoder management table, and acquires a corresponding AV decoder number.

The switching control unit 753 transmits AV decoder number acquired, and address and size of the buffer 251 to the reproduced data transfer unit 751.

The reproduced data transfer unit 751 determines a transmission destination AV decoder based on the AV decoder number received from the switching control unit 753, reads data from the address of the buffer 251 transmitted from the switching control unit 753 by the size transmitted from the switching control unit 753, and transmits the data to the AV decoder thus determined. That is, the reproduced data transfer unit 751 transmits the stream data read from the buffer 251 to either of the AV decoders depending on which of the cameras has output the data.

Further, the switching control unit 753, when switching of the stream to be reproduced is instructed by user operation, causes the AV selector 752 to switch the stream to be transmitted to the AV output 255.

For example, when reproduction of an image from the camera 120 is instructed by the user, the switching control unit 753 searches AV decoder management table, acquires the AV decoder number #2 (selection information) of the AV decoder which decodes the instructed stream, and outputs the number.

Subsequently, the AV decoder number #2 acquired and output by the switching control unit is set with regard to the AV selector 752.

The AV selector 752, upon receiving the AV decoder number #2, transmits the data output by the AV decoder AV 755 to the AV output 255. That is, the AV selector 752 selects the stream data decoded by either of a plurality of AV decoders 754, 755, . . . based on the AV decoder number, and outputs the stream data.

Thus, the stream reproducing apparatus 750 of the present embodiment is designed such that each of AV decoders more than the number of reproducible streams decodes the stream corresponding to the AV decoder, based on the common time shared between the AV decoders. Therefore, when switching of reproduction stream is instructed by the user, the stream to be displayed is promptly switched to the instructed stream.

The AV decoders 754, 755, . . . perform picture output processing by referring to the time information (in synchronization with the clock). Since the a plurality of AV decoders 754, 755, . . . refer to the time information based on the commonly shared time, image data, insofar as having the same time, are output from the plurality of AV decoders 754, 755, . . . at the same timing.

The information delivery apparatus, stream recording apparatus, recording system, stream reproducing apparatus, and record reproducing system according to the present invention have such an effect that image data or audio data transmitted from a plurality of information delivery apparatuses are recorded in a real time manner in the form of a single stream, and are useful as a system corresponding to a network and having an HDD recorder or DVD recorder provided as a home server.

What is claimed is:

1. A stream recording apparatus comprising:
a receiver side communication module for receiving from a network stream data having a frame assembly identification packet including time information inserted therein on a frame assembly basis, and for outputting the stream data;
a plurality of buffers for storing temporarily the stream data output by the receiver side communication module;
a buffer assignment unit for storing assignment information indicating a corresponding relationship between a plurality of information delivery apparatuses and the plurality of buffers;
a stream sorting unit for determining, based on the assignment information stored in the buffer assignment unit, which of the buffers is to hold the stream data output by the receiver side communication module;
a stream selector for causing, according to the determination by the stream sorting unit, the determined buffer to hold the stream data output by the receiver side communication module;
a frame assembly extraction unit for reading the stream data from the determined buffer on a frame assembly basis;
a frame assembly synchronizing unit for, based on the time information included in the frame assembly identification packet inserted to the stream data, maintaining synchronization between frame assemblies in the stream data read by the frame assembly extraction unit, and for outputting synchronization information for associating frame assemblies of the same time with each other; and
a writing unit for recording the stream data read by the frame assembly extraction unit in a recording medium.

2. The stream recording apparatus according to claim 1, further comprising a composite information preparation unit for preparing composite information indicating a data composition of the stream data, based on information corresponding to which of the information delivery apparatuses has output each of the frame assemblies read by the frame assembly extraction unit, and based on the synchronization information output by the frame assembly synchronizing unit, for multiplexing the composite information and the stream data, and for outputting the multiplexed stream data so that frame assemblies of the same time from the plurality of information delivery apparatuses become continuous,
wherein the writing unit records the stream data output by the composite information preparation unit in a recording medium in the order of output.

3. A recording system comprising:
a plurality of the information delivery apparatuses according an information delivery apparatus comprising: an encoder for encoding and packetizing digital data of an image or an audio; a frame assembly identification packet insertion unit for inserting a frame assembly identification packet including time information in the data packetized by the encoder on a frame assembly basis; and a transmission side communication module for outputting to a network the stream data having the frame assembly identification packet inserted therein by the frame assembly identification insertion unit; and
the stream recording apparatus according to claim 2.

4. The recording system according to claim 3, wherein:
the frame assembly identification packet includes an identifier for identifying each of the information delivery apparatuses, the identifier being unique to a respective information delivery apparatus of the information delivery apparatuses;
the buffer assignment unit stores information indicating a correspondence relationship between each of identifiers and each of the buffers as the assignment information, and
the stream sorting unit determines which of the buffers is to hold the stream data depending on the identifier included in the frame assembly identification packet of the stream data.

5. The recording system according to claim 4, wherein:
the stream recording apparatus further comprises an identifier assignment unit for assigning the identifier to each of the information delivery apparatuses; and
the frame assembly identification packet insertion unit of each information delivery apparatus inserts the frame assembly identification packet including the identifier assigned to that information delivery apparatus by the identifier assignment unit.

6. The recording system according to claim 3, wherein:
the stream recording apparatus comprises a frame identification information holding unit for holding, for each of the frame assemblies recorded in the recording medium, information corresponding to which of the information delivery apparatuses has output each of the frame assemblies, time information, writing position information indicating a writing position in the recording medium, and a composite information preparation result, the frame identification information holding unit judging, when a new frame assembly is read by the frame assembly extraction unit, whether the recording medium records a frame assembly of the same time as the time of the new frame assembly; and when the recording medium records a frame assembly of the same time as the time of the new frame assembly, the composite information preparation unit prepares composite information from information corresponding to which of the information delivery apparatuses has output the new frame assembly, information corresponding to which of the information delivery apparatuses has output the frame assembly of the same time, and a composite information preparation result of the frame assembly of the same time; and in the recording medium, the writing unit overwrites the composite information prepared by the composite information preparation unit by composite information of the frame information of the same time, and writes the new frame assembly in a region adjacent to the writing position of the frame assembly of the same time.

7. The recording system according to claim 3, wherein:

the stream recording apparatus comprises a second buffer for temporarily storing the stream data read by the frame assembly extraction unit and the composite information prepared by the composite information preparation unit;

the composite information preparation unit outputs an address of a data assembly stored on the second buffer and data capacity of the data assembly, the data assembly being composed of the plurality of frame assemblies of the same time and composite information of the plurality of frame assemblies; and the writing unit determines a continuous region in the recording medium to which the data assembly is written, based on the address and data capacity output from the composite information preparation unit, and writes the data assembly in the determined continuous region.

8. A stream recording apparatus comprising:

a receiver side communication module for receiving packetized data from a network and outputting the packetized data;

a frame assembly identification packet generation unit for extracting a frame assembly by analyzing packets of the packetized data output by the receiver side communication module, and for inserting a frame assembly identification packet including time information in the packetized data on a frame assembly basis;

a plurality of buffers for temporarily storing the stream data having the frame assembly identification packet inserted therein by the frame assembly identification packet generation unit;

a buffer assignment unit for storing assignment information indicating a corresponding relationship between a plurality of information delivery apparatuses and the plurality of buffers;

a stream sorting unit for determining, based on the assignment information stored in the buffer assignment unit, which of the buffers is to hold the stream data having the frame assembly identification packet inserted therein by the frame assembly identification packet generation unit;

a stream selector for causing the determined buffer to hold the stream data having the frame assembly identification packet inserted therein by the frame assembly identification packet generation unit, according to a determination by the stream sorting unit;

a frame assembly extraction unit for reading the stream data from the buffer on a frame assembly basis;

a frame assembly synchronizing unit for maintaining synchronization between frame assemblies in the stream data read by the frame assembly extraction unit based on time information included in the frame assembly identification packet inserted in the stream data, and for outputting synchronization information for associating frame assemblies of the same time; and a writing unit for recording the stream data read by the frame assembly extraction unit to the recording medium.

9. A recording system comprising:

a plurality of information delivery apparatuses according to an information delivery apparatus comprising: an encoder for encoding and packetizing digital data of an image or an audio; and a transmission side communication module for outputting to a network the data packetized by the encoder; and the stream recording apparatus according to claim 8.

* * * * *